(12) United States Patent
Oran

(10) Patent No.: US 8,867,385 B2
(45) Date of Patent: Oct. 21, 2014

(54) TUNNELING REPORTS FOR REAL-TIME INTERNET PROTOCOL MEDIA STREAMS

(75) Inventor: David R. Oran, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 242 days.

(21) Appl. No.: 13/080,585

(22) Filed: Apr. 5, 2011

(65) Prior Publication Data

US 2011/0191469 A1 Aug. 4, 2011

Related U.S. Application Data

(63) Continuation of application No. 11/761,679, filed on Jun. 12, 2007, now Pat. No. 7,936,695, which is a continuation-in-part of application No. 11/748,379, filed on May 14, 2007, now Pat. No. 8,023,419.

(51) Int. Cl.
*H04L 12/26* (2006.01)
*H04L 29/06* (2006.01)

(52) U.S. Cl.
CPC .............. *H04L 65/80* (2013.01); *H04L 65/608* (2013.01)
USPC ............................ 370/252; 370/250; 370/390

(58) Field of Classification Search
USPC ......................................... 370/252, 250, 390
See application file for complete search history.

(56) References Cited

U.S. PATENT DOCUMENTS

| | | | |
|---|---|---|---|
| 4,788,656 A | 11/1988 | Sternberger | |
| 4,907,277 A | 3/1990 | Callens | |
| 4,996,663 A | 2/1991 | Nemes | |
| 5,414,704 A | 5/1995 | Spinney | |
| 5,450,449 A | 9/1995 | Kroon | |
| 5,617,421 A | 4/1997 | Chin | |
| 5,699,478 A | 12/1997 | Nahumi | |
| 5,699,485 A | 12/1997 | Shoham | |
| 5,806,086 A | 9/1998 | Kimmel | |
| 5,842,040 A | 11/1998 | Hughes | |
| 5,859,660 A | 1/1999 | Perkins et al. | |
| 5,884,010 A | 3/1999 | Chen | |
| 5,898,837 A | 4/1999 | Guttman | |
| 5,917,830 A | 6/1999 | Chen et al. | |

(Continued)

FOREIGN PATENT DOCUMENTS

| | | |
|---|---|---|
| WO | WO 03/084134 | 10/2003 |
| WO | WO 2006/096021 A1 | 9/2006 |
| WO | WO 2007/047479 A2 | 4/2007 |
| WO | WO 2009/058645 A1 | 5/2009 |

OTHER PUBLICATIONS

T.V. Lakshman et al. High-Speed Policy-Based Packet Forwarding Using Efficient Multi-Dimensional Range Matching. 1998, ACM SIGCOMM Computer Communication Review, vol. 28 No. 4.

(Continued)

*Primary Examiner* — Jason Mattis
(74) *Attorney, Agent, or Firm* — Merchant & Gould

(57) ABSTRACT

A router, switch, or other network node generates reports that contain packet level statistics and other information for a monitored media stream. The media stream reports reduce the amount of bandwidth typically required for sending monitored media stream information back to a central analysis device. However the computation of other media stream analytics, such as long term statistical averaging or quality metric computation, is performed by the central analysis device to remove some of the processing burden from the individual network nodes.

20 Claims, 16 Drawing Sheets

(56) References Cited

U.S. PATENT DOCUMENTS

| | | |
|---|---|---|
| 5,943,347 A | 8/1999 | Shepard |
| 5,946,302 A | 8/1999 | Waclawsky |
| 5,956,721 A | 9/1999 | Douceur |
| 5,995,488 A | 11/1999 | Kalkunte |
| 5,995,971 A | 11/1999 | Douceur |
| 6,101,193 A | 8/2000 | Ohba |
| 6,104,696 A | 8/2000 | Kadambi |
| 6,185,208 B1 | 2/2001 | Liao |
| 6,275,861 B1 | 8/2001 | Chaudri |
| 6,314,095 B1 | 11/2001 | Loa |
| 6,341,130 B1 | 1/2002 | Lakshman |
| 6,356,545 B1 | 3/2002 | Vargo |
| 6,389,006 B1 | 5/2002 | Bailik |
| 6,421,802 B1 | 7/2002 | Schildbach |
| 6,434,153 B1 | 8/2002 | Yazaki |
| 6,438,695 B1 | 8/2002 | Maufer |
| 6,507,562 B1 | 1/2003 | Kadansky |
| 6,542,508 B1 | 4/2003 | Lin |
| 6,590,894 B1 | 7/2003 | Kerr |
| 6,611,502 B1 | 8/2003 | Seaman |
| 6,629,141 B2 | 9/2003 | Elzur |
| 6,658,000 B1 | 12/2003 | Raciborski |
| 6,665,637 B2 | 12/2003 | Bruhn |
| 6,671,722 B1 | 12/2003 | Stachura |
| 6,687,360 B2 | 2/2004 | Kung |
| 6,741,600 B1 | 5/2004 | Weiss |
| 6,757,654 B1 | 6/2004 | Westerlund |
| 6,760,309 B1 | 7/2004 | Rochberger |
| 6,771,657 B1 | 8/2004 | Elstermann |
| 6,801,496 B1 | 10/2004 | Saleh |
| 6,801,525 B1 | 10/2004 | Bodnar |
| 6,847,928 B1 | 1/2005 | Naka |
| 6,854,117 B1 | 2/2005 | Roberts |
| 6,868,069 B2 | 3/2005 | Knobbe |
| 6,909,702 B2 | 6/2005 | Leung |
| 6,928,482 B1 | 8/2005 | Ben-Nun |
| 6,971,119 B1 | 11/2005 | Arsenault et al. |
| 7,010,611 B1 | 3/2006 | Wiryaman |
| 7,013,267 B1 | 3/2006 | Huarte |
| 7,036,049 B2 | 4/2006 | Ali |
| 7,055,174 B1 | 5/2006 | Cope |
| 7,062,689 B2 | 6/2006 | Slobodnik |
| 7,096,481 B1 | 8/2006 | Forecast et al. |
| 7,096,488 B1 | 8/2006 | Zhang et al. |
| 7,106,749 B1 | 9/2006 | Darshan et al. |
| 7,139,242 B2 | 11/2006 | Bays |
| 7,154,855 B2 | 12/2006 | Hardy |
| 7,206,385 B2 | 4/2007 | Ethier |
| 7,248,682 B1 | 7/2007 | Oran |
| 7,269,157 B2 | 9/2007 | Klinker |
| 7,286,467 B1 | 10/2007 | Sylvain |
| 7,305,464 B2 | 12/2007 | Philipi |
| 7,324,499 B1 | 1/2008 | Borella |
| 7,430,222 B2 | 9/2008 | Green et al. |
| 7,436,830 B2 | 10/2008 | Ben-Nun |
| 7,453,829 B2 | 11/2008 | Pasha et al. |
| 7,454,494 B1 | 11/2008 | Hedayat |
| 7,483,400 B2 * | 1/2009 | Kuusinen et al. ............ 370/267 |
| 7,496,044 B1 | 2/2009 | Wing |
| 7,633,879 B2 | 12/2009 | Ramalho |
| 7,720,432 B1 | 5/2010 | Colby et al. |
| 7,817,546 B2 | 10/2010 | Filsfils et al. |
| 7,835,406 B2 | 11/2010 | Oran et al. |
| 7,848,478 B1 | 12/2010 | Huffman |
| 7,911,946 B2 | 3/2011 | Poli et al. |
| 7,936,695 B2 | 5/2011 | Oran |
| 7,940,685 B1 * | 5/2011 | Breslau et al. ............... 370/251 |
| 7,962,942 B1 | 6/2011 | Craner |
| 8,023,419 B2 | 9/2011 | Oran |
| 8,352,590 B2 | 1/2013 | Sankaran et al. |
| 2001/0013123 A1 | 8/2001 | Freeman et al. |
| 2002/0016856 A1 | 2/2002 | Tallegas |
| 2002/0064273 A1 | 5/2002 | Tomikawa |
| 2002/0075895 A1 | 6/2002 | Yamaguchi |
| 2002/0116501 A1 | 8/2002 | Ho |
| 2002/0122418 A1 | 9/2002 | Bernstein |
| 2002/0131425 A1 | 9/2002 | Shalom |
| 2002/0141392 A1 | 10/2002 | Tezuka |
| 2002/0150050 A1 | 10/2002 | Nathanson |
| 2002/0154694 A1 | 10/2002 | Birch |
| 2002/0194361 A1 | 12/2002 | Itoh |
| 2002/0194589 A1 | 12/2002 | Cristofalo et al. |
| 2002/0196850 A1 | 12/2002 | Liu et al. |
| 2003/0014705 A1 | 1/2003 | Suzuki |
| 2003/0023710 A1 | 1/2003 | Corlett |
| 2003/0026241 A1 | 2/2003 | Ono |
| 2003/0048786 A1 | 3/2003 | D'Annunzio |
| 2003/0086425 A1 | 5/2003 | Bearden |
| 2003/0117959 A1 | 6/2003 | Taranov |
| 2003/0120789 A1 * | 6/2003 | Hepworth et al. ............ 709/230 |
| 2003/0123556 A1 | 7/2003 | Komori |
| 2003/0145077 A1 | 7/2003 | Khan |
| 2003/0145233 A1 * | 7/2003 | Poletto et al. ................. 713/201 |
| 2003/0198249 A1 | 10/2003 | Klein |
| 2003/0204617 A1 | 10/2003 | Buchbaum |
| 2003/0227917 A1 | 12/2003 | Maher |
| 2004/0037267 A1 | 2/2004 | Bennett |
| 2004/0037320 A1 | 2/2004 | Dickson |
| 2004/0042456 A1 | 3/2004 | Dittmann |
| 2004/0071135 A1 | 4/2004 | Jimmei |
| 2004/0073641 A1 | 4/2004 | Minhazuddin |
| 2004/0095894 A1 | 5/2004 | Eloranta |
| 2004/0141502 A1 | 7/2004 | Corson |
| 2004/0179513 A1 | 9/2004 | Smith |
| 2004/0181599 A1 | 9/2004 | Kreusch |
| 2004/0185836 A1 | 9/2004 | Pelaez |
| 2004/0203787 A1 | 10/2004 | Naghian |
| 2004/0208186 A1 * | 10/2004 | Eichen et al. ................. 370/401 |
| 2004/0252694 A1 | 12/2004 | Adhikari |
| 2004/0264433 A1 | 12/2004 | Melpignano |
| 2005/0015816 A1 | 1/2005 | Cristofalo et al. |
| 2005/0022253 A1 | 1/2005 | Chen et al. |
| 2005/0102423 A1 | 5/2005 | Pelavin |
| 2005/0138372 A1 | 6/2005 | Kajihara et al. |
| 2005/0169174 A1 | 8/2005 | Apostolopoulos et al. |
| 2005/0182850 A1 | 8/2005 | Kohno |
| 2005/0220035 A1 | 10/2005 | Ling |
| 2005/0229232 A1 | 10/2005 | Champel et al. |
| 2005/0232227 A1 | 10/2005 | Jorgenson |
| 2005/0243733 A1 | 11/2005 | Crawford |
| 2005/0268324 A1 | 12/2005 | An |
| 2005/0276276 A1 | 12/2005 | Davis |
| 2006/0002366 A1 | 1/2006 | Kawaguchi |
| 2006/0010243 A1 | 1/2006 | DuRee |
| 2006/0029065 A1 | 2/2006 | Fellman |
| 2006/0031445 A1 | 2/2006 | Rajan |
| 2006/0031510 A1 | 2/2006 | Beck |
| 2006/0059277 A1 | 3/2006 | Zito |
| 2006/0059411 A1 | 3/2006 | Dacosta |
| 2006/0075449 A1 | 4/2006 | Jagadeesan et al. |
| 2006/0106961 A1 | 5/2006 | Ebata |
| 2006/0107187 A1 | 5/2006 | Hannuksela |
| 2006/0114855 A1 | 6/2006 | Zheng |
| 2006/0126528 A1 | 6/2006 | Ramalho |
| 2006/0130118 A1 | 6/2006 | Damm |
| 2006/0143300 A1 | 6/2006 | See |
| 2006/0182034 A1 | 8/2006 | Klinker |
| 2006/0221837 A1 | 10/2006 | Gardner |
| 2006/0221930 A1 | 10/2006 | Sweeney |
| 2006/0280207 A1 * | 12/2006 | Guarini et al. ................. 370/524 |
| 2007/0036087 A1 | 2/2007 | Kangru |
| 2007/0049307 A1 | 3/2007 | Mueckenheim |
| 2007/0061460 A1 | 3/2007 | Khan |
| 2007/0127391 A1 * | 6/2007 | Goodman .................... 370/252 |
| 2007/0199052 A1 | 8/2007 | Sankaran |
| 2007/0230486 A1 | 10/2007 | Zafirov |
| 2008/0037425 A1 | 2/2008 | Pan et al. |
| 2008/0037864 A1 | 2/2008 | Zhang |
| 2008/0069002 A1 | 3/2008 | Savoor |
| 2008/0159279 A1 | 7/2008 | Younis |
| 2008/0170117 A1 | 7/2008 | Xiao |
| 2008/0189754 A1 | 8/2008 | Yoon et al. |
| 2008/0215704 A1 * | 9/2008 | Curcio et al. ................. 709/217 |
| 2008/0220765 A1 | 9/2008 | Chu |

(56) References Cited

U.S. PATENT DOCUMENTS

| | | | |
|---|---|---|---|
| 2008/0259924 | A1 | 10/2008 | Gooch |
| 2008/0285452 | A1 | 11/2008 | Oran |
| 2008/0285463 | A1 | 11/2008 | Oran |
| 2008/0310316 | A1 | 12/2008 | Oran |
| 2008/0317011 | A1 | 12/2008 | Datta |
| 2009/0010158 | A1 | 1/2009 | Filsfils |
| 2009/0013129 | A1 | 1/2009 | Bondurant |
| 2009/0028142 | A1 | 1/2009 | Schmidt et al. |
| 2009/0119722 | A1 | 5/2009 | VerSteeg |
| 2009/0217318 | A1 | 8/2009 | VerSteeg et al. |
| 2010/0039955 | A1* | 2/2010 | Taylor et al. .......... 370/252 |

OTHER PUBLICATIONS

Pendleton, et al., Session Initiation Package for Voice Quality Reporting Event, Sipping Working Group, 2006, pp. 1-24.

J. Postel, "User Datagram Protocol," Retrieved from http://www.faqs.org/rfcs/rfc768.html on Jun. 13, 2009, Originally published Aug. 28, 1980, pp. 1-3.

Information Sciences Institute, University of Southern California; Internet Protocol DARPA Internet Program Protocol Specification; Sep. 1981; pp. 1-49.

Information Sciences Institute, University of Southern California; Transmission Control Protocol, DARPA Internet Program Protocol Specification; Sep. 1981; pp. 1-88.

R. Braden; Network Working Group; Requirements for Internet Hosts—Communication Layers; Oct. 1989, pp. 1-115.

Degermark, IP Header Compression; Feb. 1999; RFC 2507.

Hamzeh, K., Pall G., Verthein, W. Taarud, J., Little, W. and G. Zorn, "Point-to-Point Tunneling Protocol (PPTP)", RFC 2637, Jul. 1999.

Liao et al., Adaptive recovery techniques for real-time audio streams, IEE INFOCOM 2001. Twentieth Annual Joint Conference of the IEEE Computer and Communications Societies. Proceedings. Apr. 22-26, 2001, vol. 2, pp. 815-823.

Rosenberg, An Offer/Answer Model with Session Description Protocol (SDP); Jun. 2002; RFC 3264.

Friedman, T. et al., "RTP Control Protocol Extended Reports (RTCP XR)" RFC 3611, Nov. 2003, 55 pages.

Kevin Song X., "The ABC's of Network Security", The Certified Security Professional, Certification Magazine, Feb. 2004.

B. Thompson, Tunneling Multiplexed Compressed RTP (TCRTP); Nov. 2005; RFC 4170.

Jonsson; Robust Header Compression (ROHC): A Link-Layer Assisted Profile for IP/UDP/RTP; Jan. 2006; RFC 4362.

Welch, A Proposed Media Delivery Index (MDI); Apr. 2006; RFC 4445.

D. Singer and Desineni, "A General Mechanism for RTP Header Extensions", draft-ietf-avt-rtp-hdrext-12txt, Feb. 26, 2007.

Stolowitz Ford Cowger Listing of Related Cases, Dec. 17, 2009.

International Search Report for PCT/US06/069120; Mailing Date Nov. 17, 2010.

Schulzrinne, et al., RTP: A Transport Protocol for Real-Time Applications, Network Working Group, RFC 3550 2003, pp. 1-92.

International Preliminary Report dated May 4, 2010 cited in Appl. No. PCT/US2008/080882, 7 pgs.

Chinese First Office Action dated Sep. 27, 2012 cited in Application No. 200880123531.2, 27 pgs.

Chinese Second Office Action dated Jun. 5, 2013 cited in Application No. 200880123531.1, 27 pgs.

Chinese Rejection Decision dated Jan. 27, 2014 cited in Application No. 200880123531.2, 28 pgs.

U.S. Office Action dated Oct. 25, 2010 cited in U.S. Appl. No. 11/933,483, 20 pgs.

U.S. Office Action dated May 3, 2011 cited in U.S. Appl. No. 11/933,483, 15 pgs.

U.S. Office Action dated Jun. 7, 2011 cited in U.S. Appl. No. 12/434,480, 16 pgs.

U.S. Final Office Action dated Oct. 21, 2011 cited in U.S. Appl. No. 11/933,483, 17 pgs.

U.S. Final Office Action dated Feb. 28, 2012 cited in U.S. Appl. No. 12/434,480, 17 pgs.

U.S. Office Action dated Dec. 9, 2013 cited in U.S. Appl. No. 11/933,483, 26 pgs.

J. Brassil et al., "Structuring Internet Media Streams With Cueing Protocols," IEEE/ACM Transactions on Networking, New York, NY, vol. 10, No. 4, Aug. 1, 2002, pp. 466-476.

"MPEG-7 Overview," (latest version: Version 10), Oct. 2004, International Organisation for Standardisation Organisation Internationale de Normalisation ISO/IEC JTC1/SC29/WG11 Coding of Moving Pictures and Audio, N6828, 93 pgs.

P. Marques et al., "Monitoring Emerging IPV6 Wireless Access Networks," IEEE Wireless Communications, vol. 12, No. 1, Feb. 2005, pp. 47-53.

Marek Burza et al. Adaptive Streaming of MPEG-based Audio/Video Content over Wireless Networks, Apr. 2007, pp. 17-27, vol. 2, No. 2, Journal of Multimedia.

U.S. Final Office Action dated May 27, 2014 cited in U.S. Appl. No. 11/933,483, 12 pgs.

U.S. Office Action dated Jun. 6, 2014 cited in U.S. Appl. No. 12/434,480, 32 pgs.

* cited by examiner

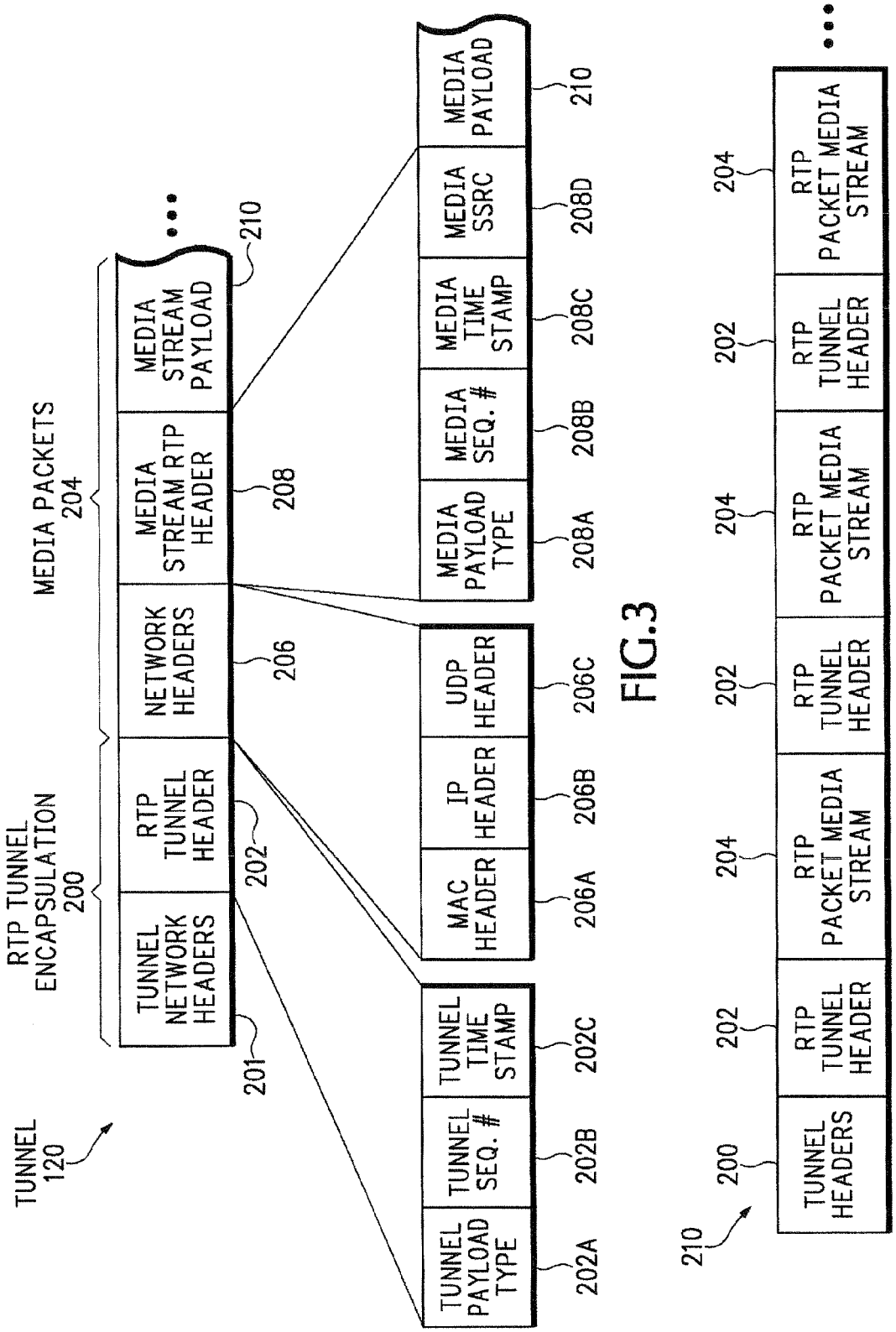

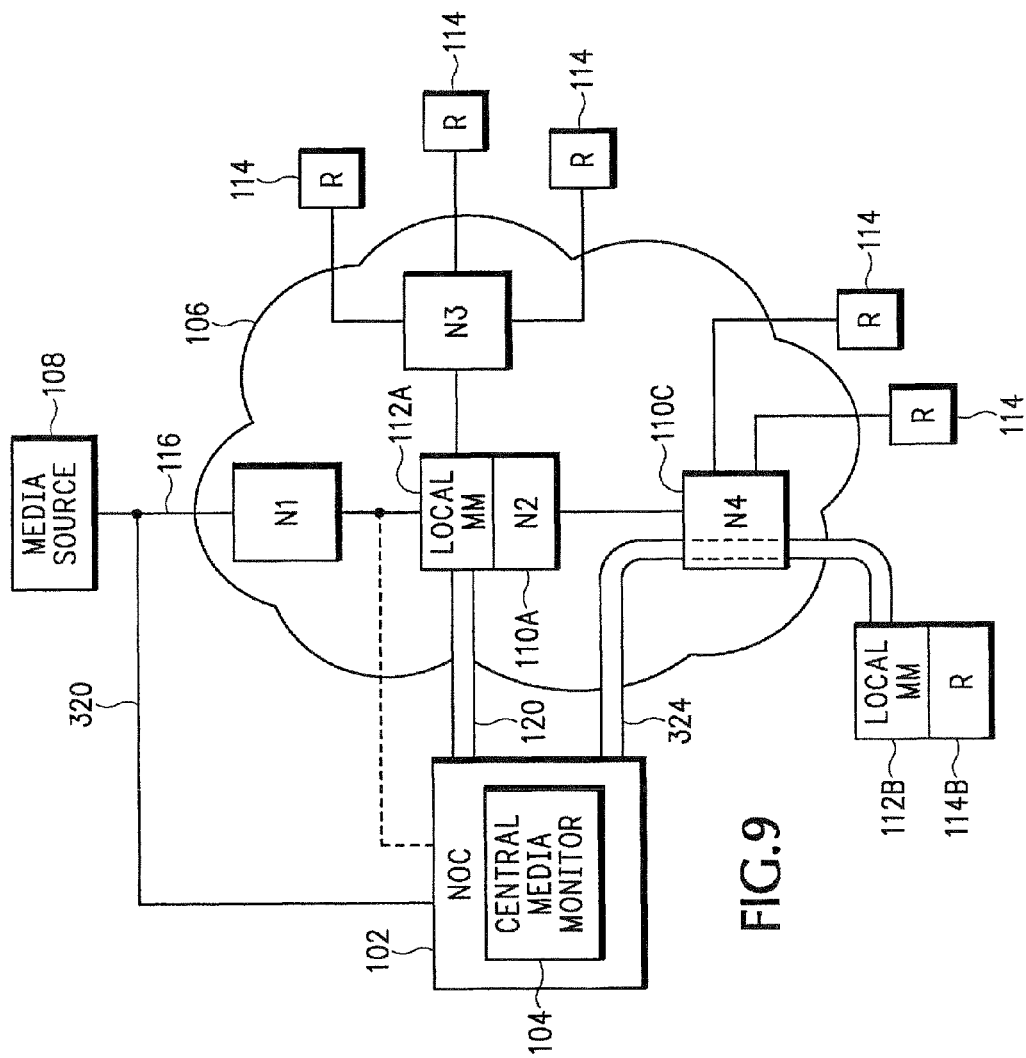

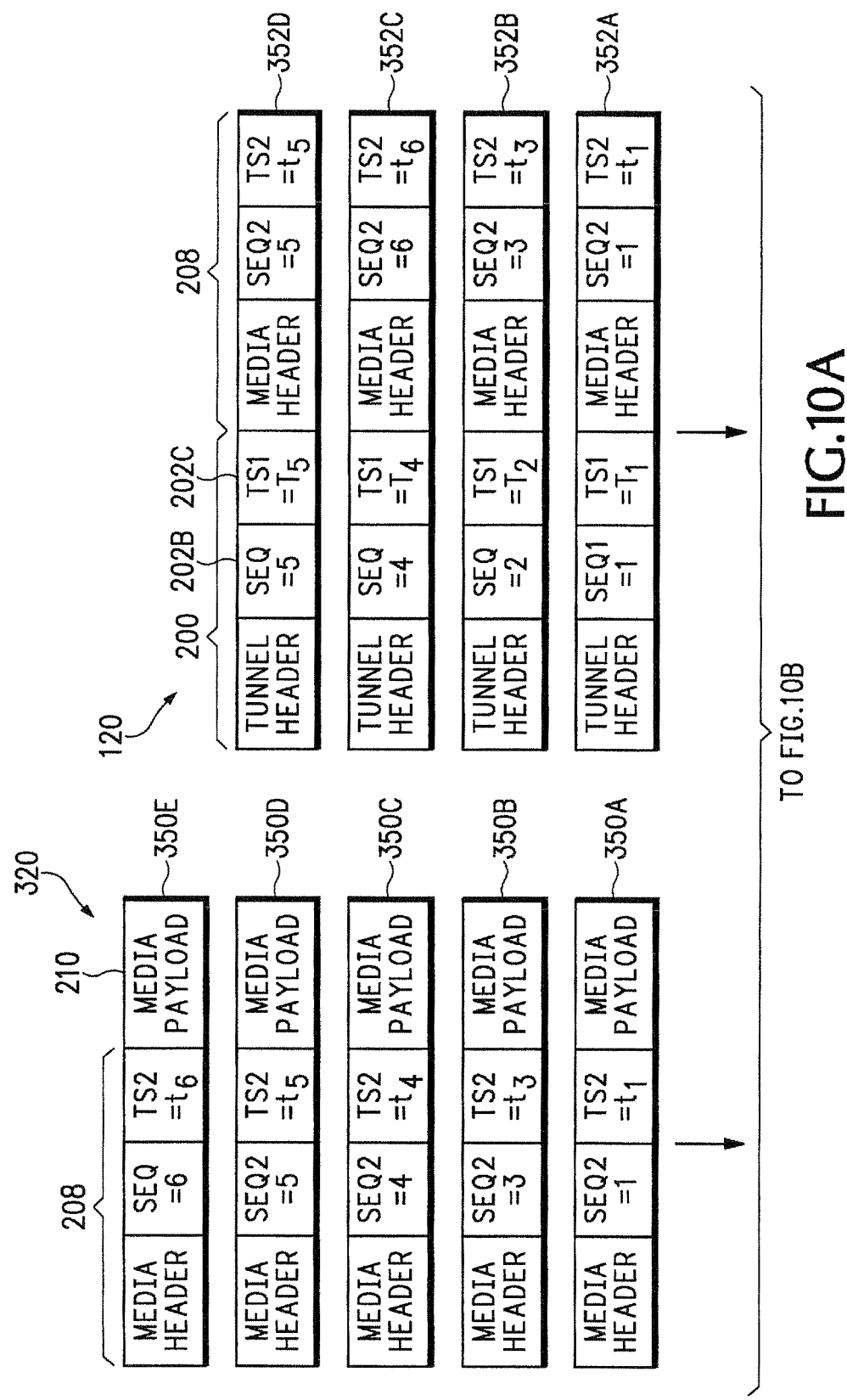

TUNNELING REPORTS FOR REAL-TIME INTERNET PROTOCOL MEDIA STREAMS

This is a continuation of U.S. patent application Ser. No. 11/761,679, entitled: TUNNELING REPORTS FOR REAL-TIME INTERNET PROTOCOL MEDIA STREAMS filed Jun. 12, 2007, which is a continuation in part of U.S. patent application Ser. No. 11/748,379 filed May 14, 2007, entitled: REMOTE MONITORING OF REAL-TIME INTERNET PROTOCOL MEDIA STREAMS both of which are herein incorporated by reference in their entirety.

TECHNICAL FIELD

The present disclosure relates generally to the field of networking.

BACKGROUND

Fault isolation and diagnosis of real-time Internet Protocol (IP) multimedia streams is difficult because the endpoints of the communication have little or no insight into the causes and sources of impairments. The endpoints only know that packets are being lost or delayed by some element, such as a router or switch, along the media network path.

The problem is exacerbated in the case of multicast real-time sessions where any router or switch in the network may replicate and forward packets along different sub-branches of a multicast tree. Hence the impairment patterns seen by different receivers (endpoints) may be very different. Comparing the patterns seen by different receivers may provide further insight into where the problem lies, but is often insufficient to identify with high confidence the particular router, switch, or link causing the fault.

It may be desirable to periodically or continuously monitor many media streams at the same time to get further insight into possible network problems. However the network devices may not have the available processing capacity or bandwidth to continuously send a large number of monitored media streams to one central monitoring site.

BRIEF DESCRIPTION OF THE DRAWINGS

FIG. 3 shows an RTP tunnel used by the media monitoring system.

FIG. 4 shows an alternative embodiment of the RTP tunnel shown in FIG. 3.

FIG. 9 is a block diagram showing how the media monitoring system uses a reference media stream.

FIGS. 10A and 10B show in more detail how tunneled media packets are used in conjugation with the reference media stream.

DESCRIPTION OF EXAMPLE EMBODIMENTS

Overview

Figure 1:
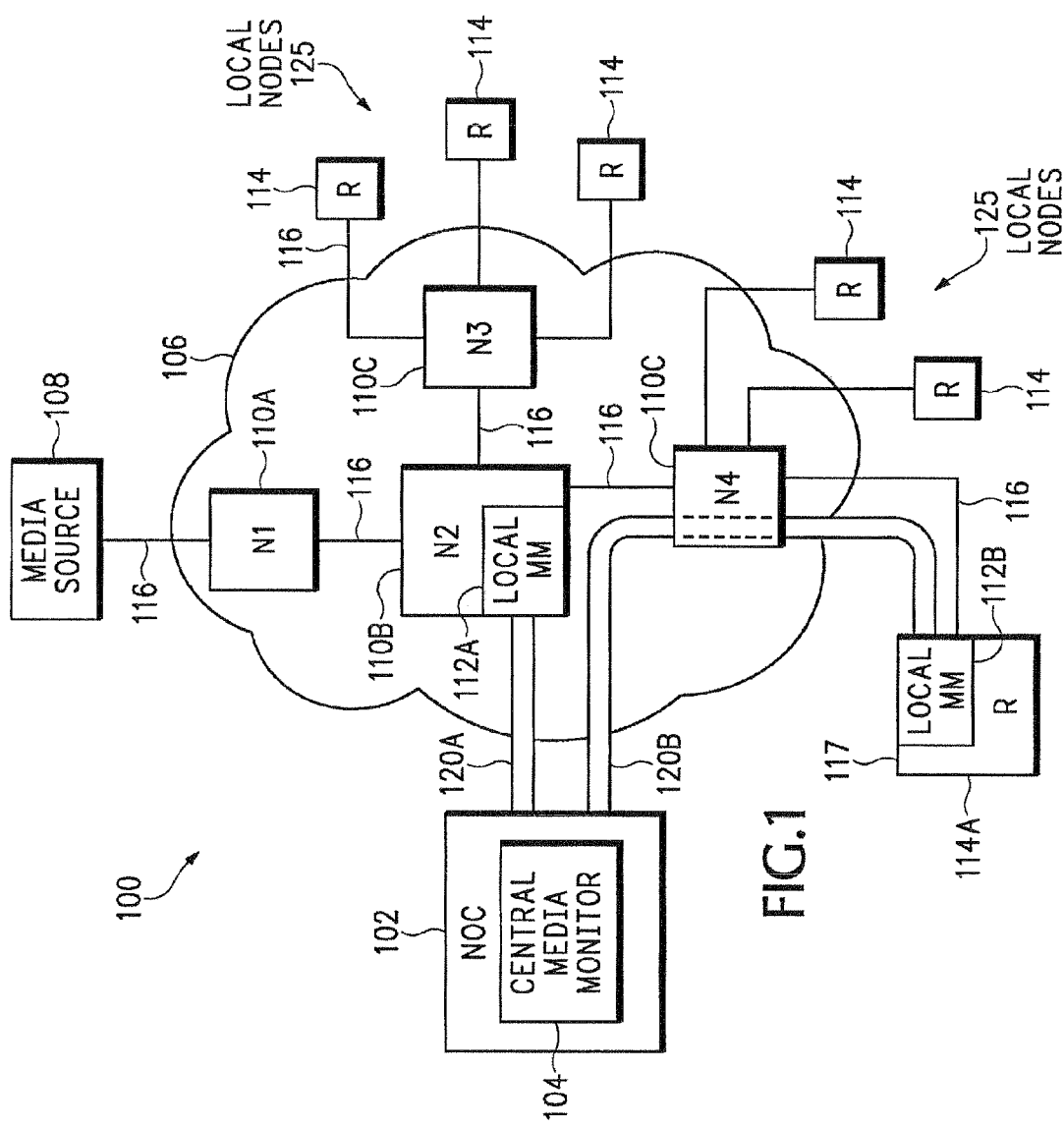
FIG. 1 is a block diagram showing a media monitoring system.

A router, switch, or other network node generates reports that contain packet level statistics and other information for a monitored media stream. The media stream report summary reduces the amount of bandwidth typically required for sending monitored media stream information back to a central analysis device. However the computation of other media stream analytics, such as long term statistical averaging or quality metric computation, is performed at to the central analysis device to remove the majority of the processing burden from the individual network nodes.

Description

Monitoring of multimedia streams in intermediate devices increases the ability to identify and diagnose faults. There are three general classes of such intermediary monitoring facilities. A first class includes intermediaries which join media streams as receivers and process the entire media stream as a normal receiver. Such intermediaries may even include specialized stream analysis hardware and software such as are used for quality testing and assessment. These localized systems in most cases are far too expensive to provide monitoring at every potential point where multimedia traffic passes through an Internet Protocol (IP) network.

Another class comprises intermediaries which capture and dump bulk traffic traces to local or remote storage for offline analysis. These capabilities are provided by Switched Port ANalyzer (SPAN) ports and full Netflow traffic tracing. Such systems work well for forensics but are not well suited to real-time fault isolation and diagnosis.

Another class includes intermediaries which monitor individual multimedia streams and compute some statistics based on observation of the traffic flows. The statistics are typically passed through an assessment filter, and if certain thresholds are exceeded, an alarm may be raised. A proposed Media Delivery Index (MDI) described in RFC4445 falls into this category. Flow monitoring with measurement suffers from a difficult tradeoff between the amount of work required to extract the relevant measurements as the data passes through an intermediary node versus the usefulness of the statistics for fault isolation and diagnosis.

All of these systems need a control scheme for turning the measurement and capture machinery on and off in the relevant network nodes, and some external inputs which decide which points in the network to monitor. Care must be taken when turning on these kinds of monitoring. For example adding a receiver to a multicast session, particularly one near the source, may cause the multicast tree to be recomputed significantly perturbing normal network operation.

Lawful Intercept (LI) or "wiretapping" intercepts packets for identified flows and tunnels the flows to a monitoring point called a "mediation device". The LI systems typically require the intercepted stream to have near perfect fidelity. However, precise fidelity is not always necessary in Quality of Service (QoS) monitoring systems. Conversely, the LI systems do not need to preserve the exact timing of the original media stream. However, accurately identifying media stream timing is very important for multimedia monitoring.

Remote Media Monitoring

FIG. 1 shows a media monitoring system 100. A media source 108 may send media packets from a media stream 116 to any combination of receivers 114 via a packet switched Internet network 106 alternatively referred to as the Internet. The media source 108 could be a server that stores the media locally or receives the media from another server or media source via another network, satellite, cable, or any other communication media.

The receivers 114 could be Personal Computers (PCs), Set-Top Boxes (STBs), Personal Digital Assistants (PDAs), Voice Over Internet Protocol (VoIP) phones, Internet connected televisions, cellular telephones, or any other device that receives media packets. The packet switched network 106 includes multiple different intermediary nodes 110 that direct media packets from media source 108 to one or more of the different receivers 114. The intermediary nodes 110 may be routers, switches, gateways, or any other network processing device. The intermediary nodes 110 and receivers 114 are all referred to generally as local nodes 125.

A Network Operation Center (NOC) 102 provides a central location for monitoring the operation of different local nodes in Internet network 106. The NOC 102 can be any combination of servers and processors that analyze information transmitted by any combination of different local nodes 110 and/or 114.

A central media monitor 104 operates in the NOC 102 and communicates with one or more local Media Monitors (MMs) 112A and 112B that operate locally in the different local nodes 112 and/or 114. The local MM 112 traps media packets from the real-time multimedia stream 116, clones the packets by copying them, and tunnels the packets over different tunnels 120A and 120B to the central media monitor 104 for analysis.

Sending the captured media packets from local nodes 125 to media monitor 104 allows media analysis to be centralized at NOC 102. This eliminates having to use expensive media monitoring equipment at local node. Further, using novel tunneling techniques, the central media monitor 104 can reproduce the media streams with a fidelity equal to that obtainable by monitoring equipment actually located at the individual local nodes.

Figure 2:
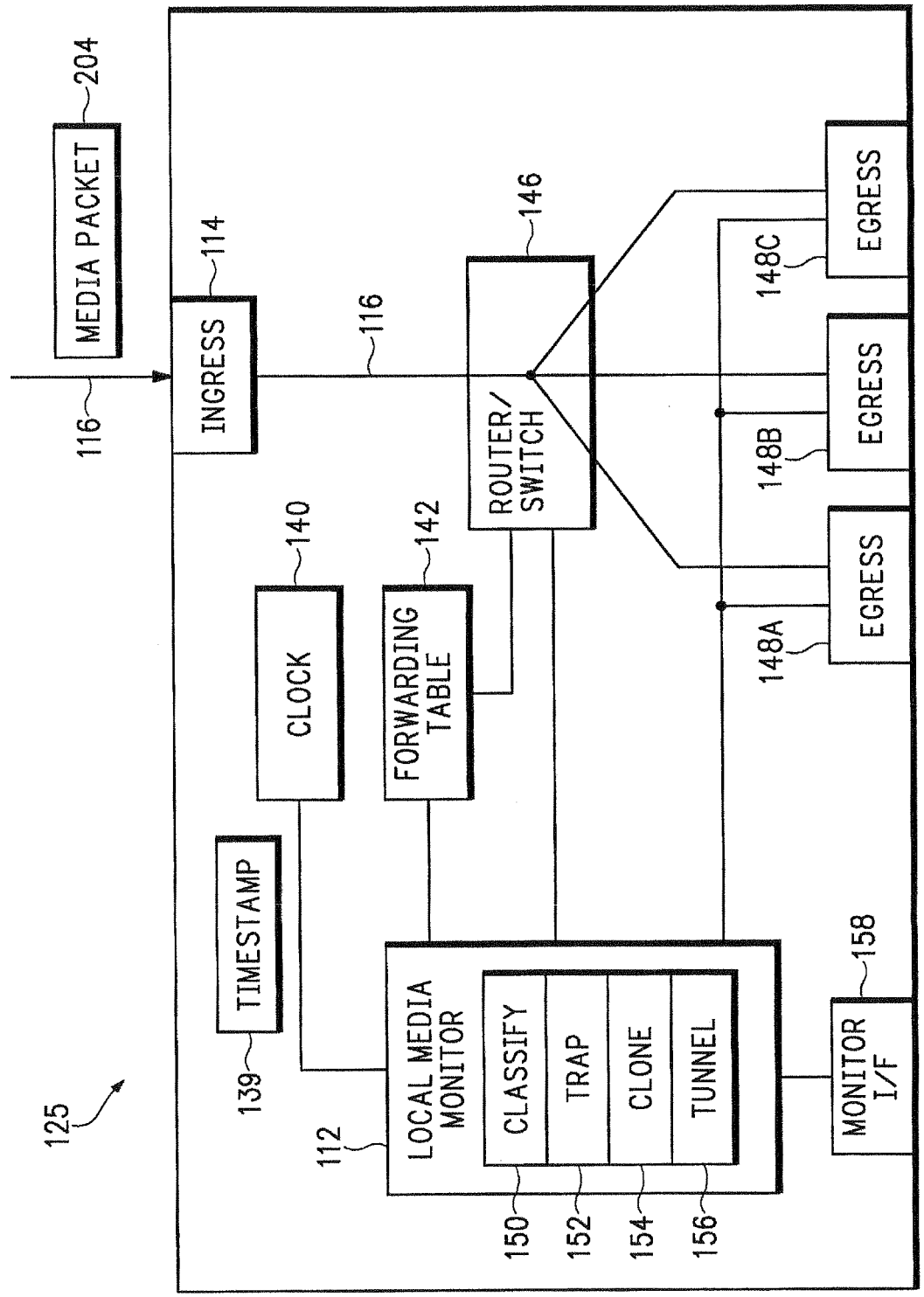
FIG. 2 is a block diagram of a network node used in the media monitoring system in FIG. 1.

FIG. 2 shows the internal operations that may be performed by one of the intermediary nodes 110 or by any of the receivers 114 shown in FIG. 1 (local nodes 125). The local media monitor 112 may be operated by a processor and conducts different classify 150, trap 152, clone 154, and tunnel 156 operations.

Classification

The flow classifier 150 is installed in the data path 146 of the router, switch, or receiver 125 for a particular interface identified by the central media monitor 104 (FIG. 1). In the case of a unicast media flow 116 (FIG. 1), the interface can be ascertained by looking up an entry in a Forwarding Information Base (FIB) in forwarding table 142 for a 5-tuple also identified by the central media monitor 104. The classifier 150 is then installed on an associated egress interface 148, or set of interfaces if load splitting is in effect. In the case of a multicast media stream 116, there may be multiple egress interfaces 148A-148C. In this case, the local media monitor 112 can either select one or more of the egress interfaces 148, or select the ingress interface 144 by examining a multicast Routing Information Base (RIB) in forwarding table 142.

Since IP multicast is tree-based, there will be only a single ingress interface 144 for a flow. In unicast, equal cost path splitting could result in packets for a flow arriving on multiple ingress interfaces. Thus, it often makes sense to only capture packets on egress interfaces 148. There may also be an advantage to trapping on the egress interfaces 148. For example, a packet may be dropped from an output queue due to congestion. Capturing packets on the egress interfaces 148 allow these dropped packets to be detected and reflected in the media monitoring session.

Trap

Packets from media stream 116 that match the classifier 150 on the selected interface are trapped by trap operation 152. In order to capture accurate flow timing, the trap operation 152 assigns and binds an associated timestamp value 139 provided by clock 140 with the trapped packet the instant the packet is trapped. For ingress interface 144, the timestamp value 139 from clock 140 is chosen to be close as possible to the moment the media packet 204 is received from the ingress interface 144. For egress interfaces 148, the timestamp values 139 are as close as possible to the instant when the last bit of the packet 204 has departed the output queue (not shown) for successfully transmitted packets. A good approximation of this instant is when the transmit-done interrupt occurs. For dropped packets, the timestamp 139 is as close as possible to the instant when the queuing system scheduler decides to discard packet 204.

Clone

The cloning operation 154 makes a copy of the trapped packet 204. When trapping is completed on an ingress interface 144, the packet 204 is physically cloned since the original packet continues through the normal forwarding circuitry of the router/switch 146, and in the case of multicast, through additional replication circuitry. For a multicast stream 116, the clone operation 154 could perform the cloning using the native replication circuitry of the multicast forwarding system 146 and hence get the cloned packet "for free".

When the ingress interface 144 includes ingress queuing, a queued packet could be discarded at ingress due to congestion or system overload. These discarded packets can be marked by the clone operation 154 to notify the central media monitor 104 that the packet was discarded by the local node 125.

In the case of the egress interfaces 148, it is also possible to physically copy the packet. However, an alternative technique takes the original packet off an output buffer ring (not shown) when a transmit done signal is activated and hand the packet directly to the tunnel operation 156. This simply reassigns the output packet buffer to the tunnel operation 156 rather than recycle the output buffer to an output buffer pool. The packet buffer can be reassigned instead of making a copy for packets being discarded.

These different optimizations may or may not be used depending on the relative cost in memory and processing tradeoffs of making copies versus the cost and complexity of managing the re-assignment of packet buffers. In either case the cloned packets are then handed to the tunnel operation 156.

Tunneling

Referring to FIG. 3, the tunnel operation 156 in FIG. 2 encapsulates the cloned media packets 204 into tunnels 120. In order to preserve the exact timing and loss information related to the original real-time media stream 116, the tunneling uses a Real-Time Protocol (RTP) session to instantiate the tunnel. RTP has the useful properties of providing sample timing, sequence preservation, and loss detection for the data in the tunnel. In the example described below, each trapped and cloned media packet 204 is an RTP packet. However, other types of media packets, such as native MPEG packets, MPEG-in-ATM, MPEG-over-CATV, or MPEG encapsulated in UDP, may also be trapped, cloned and tunneled.

Each media packet 204 includes network headers 206 used for forwarding the media packet through the IP network 106 (FIG. 1). The network headers 206 may include a Media Access Control (MAC) header 206A, an Internet Protocol (IP) header 206B, and a User Datagram Protocol (UDP) header 206C.

It is not strictly necessary to include any Layer 2 headers (e.g. the MAC headers mentioned above) that may have been on the packet at the time it was trapped and cloned. A UDP payload without the corresponding IP and UDP headers may be provided if the tunnel setup provides the same flow information that the IP header 206B and UDP header 206C would provide.

The media packets 204 may also include media stream headers that are used for identifying the timing and sequence of media for the associated media stream. For example, a RTP header 208 may include a media payload type 208A, a media sequence number 208B, media timestamp 208C, and a media Synchronization SouRCe identifier (SSRC) 208D, among other fields. Finally the media packet 204 includes a media stream payload 210 that includes, but is not limited to, audio and/or video information.

The local media monitor 112 (FIGS. 1 and 2) encapsulates the media packet 204 in a tunnel header 200 that includes tunnel network headers 201 and RTP tunnel header 202. The tunnel network headers 200 include any addressing needed for transporting the tunnel packets 120 from the local node 125 to the NOC 102 (FIG. 1). The RTP tunnel header 202 may include a tunnel payload type 202A, a tunnel sequence number 202B, and a tunnel timestamp 202C, among other tunnel information.

The tunnel operation 156 in FIG. 2 synchronizes the timestamp value 139 with the interface hardware/software that implements the packet trap operation 152. This timestamp value 139 associated with the trapped and cloned packet is converted, if necessary, into the RTP tunnel timestamp 202C in FIG. 3. The tunnel timestamp 202C is used by the central media monitor 104 (FIG. 1) to recover the original timing of the media packet 204 as seen by the local media stream monitor 112.

Reducing Bandwidth

Whenever tunnels are constructed it is possible to run into Maximum Transmission Unit (MTU) issues due to the tunnel headers adding bytes to the original packets. Using RTP for tunneling adds additional overhead of 40 bytes in the case of IPv4 (RTP=12, UDP=8, IP=20). Since stream fidelity should be maintained, some situations may require using IP fragmentation. These MTU issues can be negotiated as part of tunnel setup. Thus, a need exists for reducing the number of bits in these tunneled media packets.

Both compressing/blocking the headers and eliminating the payload may be particularly useful when monitoring media streams 116 at the subscriber end of access links 117 (FIG. 1). For example, Home Access Gateways (HAG) or Residential Gateways (RGs) may be monitored remotely. The media stream 116 may be monitored on these residential nodes 114 so long as the tunneled flow does not consume too much of the limited upstream bandwidth available on many access networks links 117. The compression and/or filtering of certain headers or payload data allows a large number of residential nodes, such as receivers 114, to perform local monitoring and transport the monitored filtered data over tunnels 120 to the NOC 102.

FIG. 4 shows how multiple RTP packets 204 from the original media stream 116 are combined in a single tunnel packet 210. Multiple tunnel RTP headers 202 and their different associated media packets 204 are blocked into a single tunnel packet 210. The RTP headers 202 are then used to reconstruct the arrival timing for their associated media packets.

This is particularly effective when the payloads are being suppressed. The RTP header compression can also be used on the tunneled stream to further reduce required bandwidth. The RTP header compression is described in Request for Comment (RFC) 4362, RFC 4170, and RFC 2507 and is therefore not described in further detail. If the media flow being monitored is an RTP flow, the RTP payload 210 may optionally be omitted, the tunneled packet 204 may consist of just the RTP headers 208 for the packets being monitored.

Figure 5:
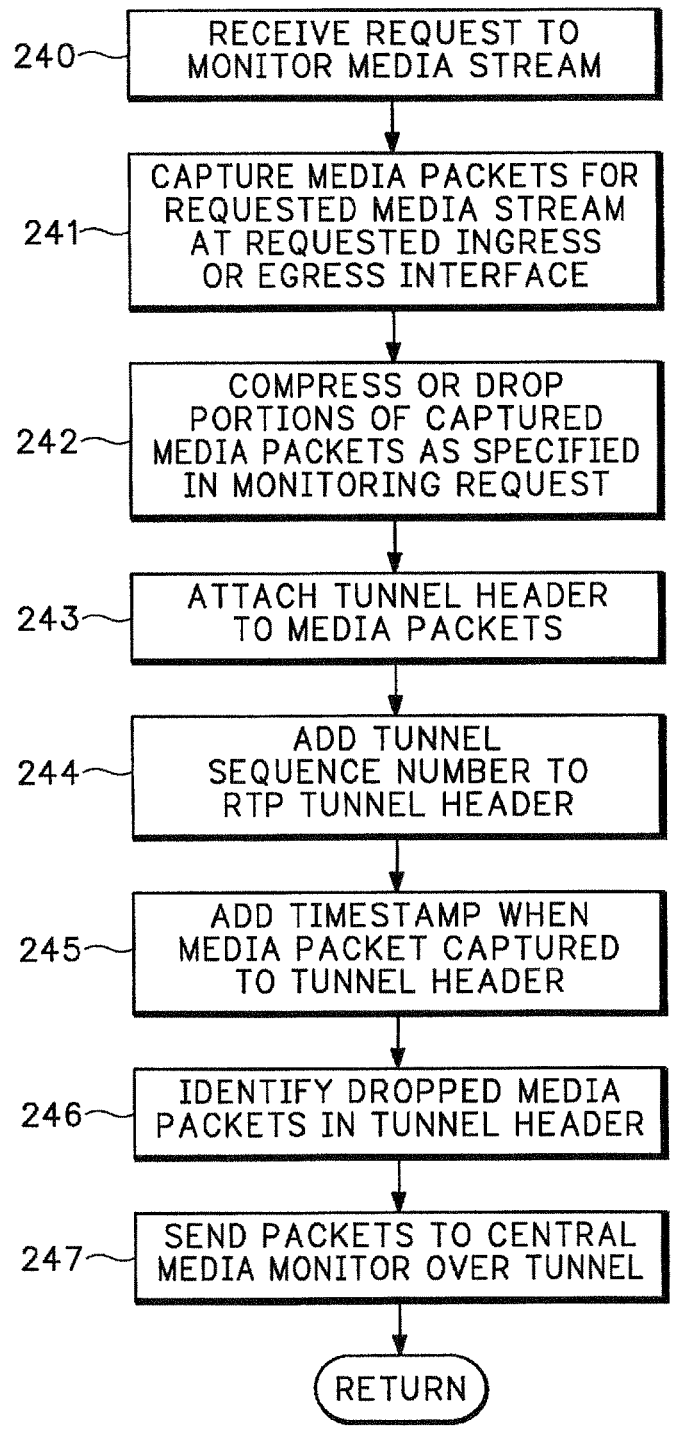
FIG. 5 is a flow diagram showing in more detail operations performed by the network node in FIG. 2.

FIG. 5 further describes some of the operations performed by the local media monitor 112 in the local network node 125. In operation 240, the local media monitor receives a request to monitor a particular media stream from the central media monitor 104 in the NOC 102 (FIG. 1). The local media monitor in operation 241 captures the media packets for the requested media stream for a particular ingress or egress interface that may be identified by the central media monitor 104.

In operation 242, the headers of captured media packets may be compressed and/or the payload contents removed from further tunneling pursuant to monitoring requests from the central media monitor 104. The local media monitor 112 attaches a tunnel header to the remaining portions of each of the captured media packets in operation 243. A tunnel sequence number is added to the tunnel headers in operation 244 that identifies a sequential count for the encapsulated tunneled packets sent from the local node 125 to the NOC 102.

A tunnel timestamp is also added to each of the tunnel headers in operation 245 that is associated with the time at local node 125 when the media packet was actually captured or trapped by the local media monitor 112. Packets that are dropped by the local node 125 may be identified and an associated tag or identifier inserted in the corresponding tunnel header in operation 246. The encapsulated media packets or media packet identifiers are then sent over the tunnel 120 to the central media monitor 104 in operation 247.

Tunnel Setup and Flow Description

Figure 6:
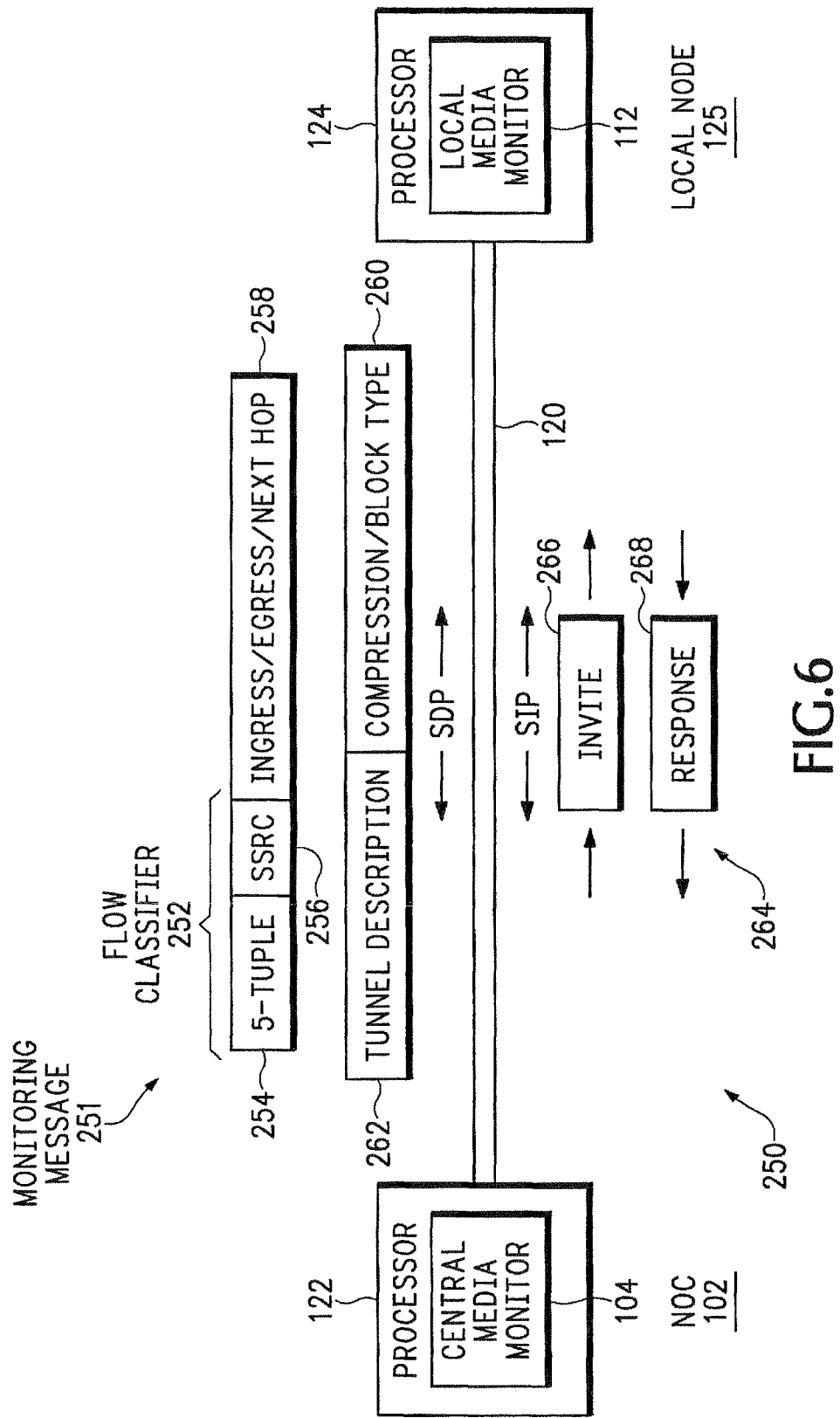
FIG. 6 shows media monitoring messages exchanged between a central media monitor and a local media monitor.

Referring to FIG. 6, a processor 122 in the NOC 102 operates as the central media monitor 104 and a processor 124 in the router/switch 112 or receiver 114 (local node 125) operates as the local media monitor 112. In one example, the central media monitor 104 and the local media monitor 112 are computer instructions that are operated by processors 122 and 124, respectively. However, any other type of logic or processing could alternatively be used for performing the monitoring operations described below.

Any variety of different control protocols can be used to set up the tunnels 120. Control Protocols such as Simple Network Management Protocol (SNMP) can be used to define and control the tunnels 120. A simple transport establishment protocol like Stream Control Transmission Protocol (SCTP) could also be used, with the RTP packets carried as unreliable SCTP segments.

In one embodiment, a session rendezvous protocol specifically tailored to real-time multimedia is used. This could include H.323 and Session Initiation Protocol (SIP). Another alternative may include using a Session Announcement Protocol (SAP) and multicasting for instantiating the tunnel rather than unicast. This allows multiple monitoring stations to join a monitoring session and receive the tunneled data via multicast rather than unicast.

In one embodiment, the central media monitor 104 sends a monitoring message 251 to the local media monitor 112 that identifies the media streams 116 to be trapped via a flow classifier 252. Any number of existing flow classification schemes can be used such as a flexible netflow scheme or a common classification engine. In one example, the flow is identified using a IP 5-tuple 254, and optionally by using an Real-Time Protocol (RTP) Synchronization SouRCe identifier (SSRC) 256.

Techniques such as traceroute and mtrace can be used to identify the routers/switches on the tree for a multimedia flow 116, and the monitoring facility enabled on any subset of those network elements as desired. There may be multiple flows that are closely bound to one another that need to be simultaneously monitored through the tunnel 120. Examples are sessions that consist of separate video and audio streams, or sessions constructed by layered coding with a separate flow for each layer. This information may also be used in many monitoring cases to substitute for actually sending the IP header 206B and UDP header 206C for the tunneled packets 204 (FIG. 3). In other cases these headers may be included. For example, the IP header 206B in FIG. 3 may need to be included when the central media monitor 104 needs to know if different packets are sent with different Differentiated Services Code Points (DSCPs).

The monitoring message 251 may also identify where to install the trap. While it is possible to simply enumerate the individual interfaces, this may have disadvantages. For example, the central media monitor 104 may need to know how a given system names interfaces, and need a possibly dynamic way to determine the interfaces associated with the media flow 116.

The following describes one preferred embodiment used for interface binding. For a unicast flow, the monitoring message 251 may simply indicate ingress or egress in field 258 and let the local node 125 performing the trap-clone-tunnel determine where to put the trap. For a multicast flow, the monitoring message 252 may indicate ingress in field 258 for ingress trapping. Alternatively, field 258 may also give a set of IP addresses of next hops that are branches of the multicast sub-tree emanating from the local node to be monitored.

The same or a separate tunnel description message 262 is used for describing the tunnel itself, the destination IP address and port of the tunnel 120, etc., and may include the RTP payload type mappings. The tunnel description message 262 may also include compression/block type information 260 that identifies which headers and payloads should be passed through the tunnel 120, such as IP and UDP headers or the media payload.

Figure 7:
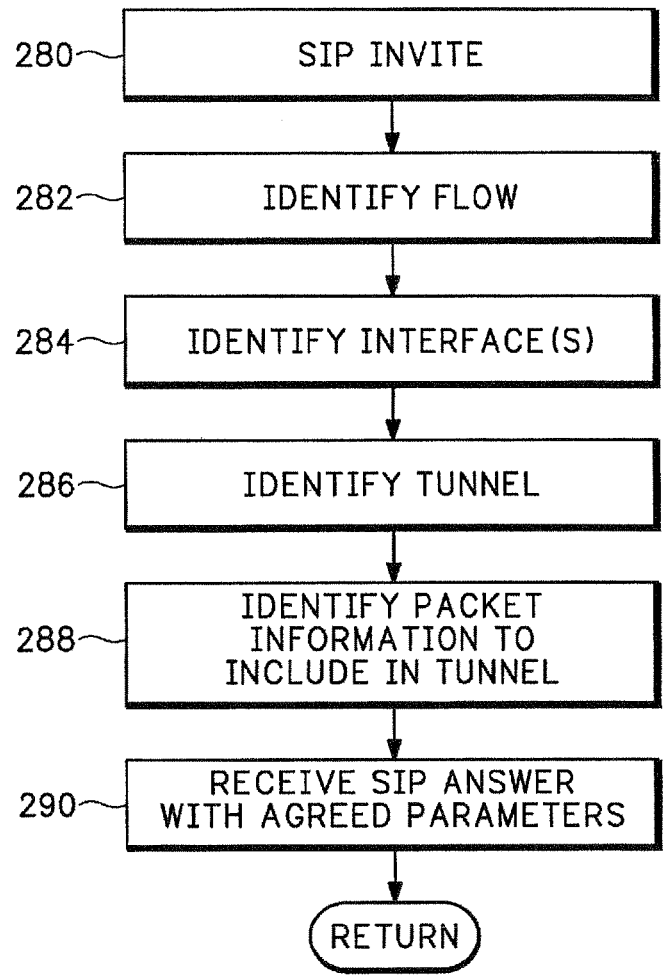
FIG. 7 is a flow diagram showing tunneling messaging exchanged between the central and local media monitors.

Referring to FIGS. 6 and 7, the central media monitor 104 may use a Session Initiation Protocol (SIP) 264 to establish the tunnel and a Session Description Protocol (SDP) for describing both the flow classifiers in monitoring message 251 and describing the tunnel itself in tunnel description message 262. The central media monitor 104 wanting to establish the trap-clone-tunnel session, initiates a SIP invite 266 transaction in operation 280 to set up the tunnel 120 and instruct the local node 125 what to trap and how to tunnel.

The SIP transaction 264 may contain three MIME body parts and include an application/SDP body part 252 that describes the flow to be monitored in operation 282. A text encoded or specifically registered MIME application body part 258 in operation 284 may identify the interface information for monitoring different ingress or egress interfaces as described above.

An application/SDP body part 262 in operation 286 constitutes an SDP offer with a description of the tunnel 120. This SDP body part 262 in operation 288 may be enhanced with some payload-format specific information 260 that indicates which headers to include and whether to include the user payload in the tunneled packets. For example, field 260 in FIG. 5 identifies any type of media packet information that may be compressed or left out of the information encapsulated in tunnel 120.

The local media monitor 112 installing the trap may contain a SIP UAS which attempts to complete the session setup as requested. Standard SIP errors are returned if any part of the operation fails. If the operation succeeds, a SIP "200 OK" response 268 is received in operation 290 with a single MIME body part containing the agreed parameters for the tunnel 120. This conforms to the commonly-used SDP offer-answer methodology documented in RFC3264. At this point the trap-clone-tunnel is in operation and media packets are then intercepted by local media monitor 112 and sent through the tunnel 120 to the central media monitor 104.

Processing Tunneled Media Flows

Figure 8:
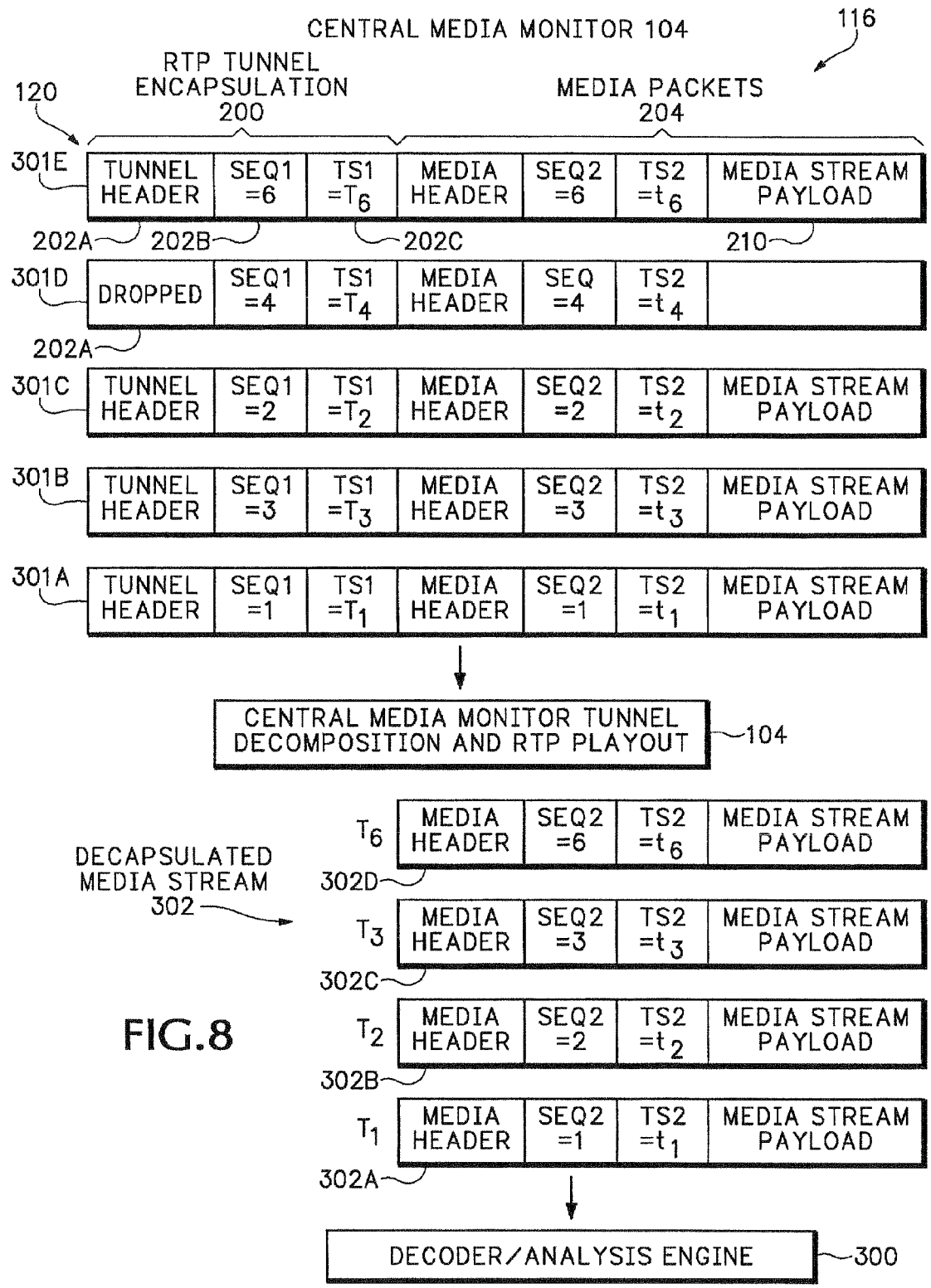
FIG. 8 shows how tunneled media packets are processed.

FIG. 8 shows one example of how the central media monitor 104 processes the tunneled media packets. In FIG. 8, the RTP tunnel 120 is shown including five tunnel packets 301A-301E. Each tunnel packet 301 has an associated sequence number 202B and an associated timestamp 202C. In this example, the tunnel packets 301 are received out of order from how they were originally trapped and encapsulated by the local node 125. For example, tunnel packet 301B was trapped at time T3 and assigned sequence number 3 and tunnel packet 301C was trapped at time T2 and assigned sequence number 2. However, the central media monitor 104 received tunnel packet 301B before packet 301C.

Further, the tunnel headers 202A indicates that the local node 125 dropped the fourth media packet in the native media stream 116 prior to being trapped and tunneled to the central media monitor 104. The tunnel packets 301 also indicate that one of the successfully trapped media packets encapsulated as RTP tunnel sequence number 5 was lost somewhere during the tunnel transmission from local node 125 to NOC 102.

The media monitor 104 separates the native media packets 204 from the RTP tunnel encapsulation headers 200 and sends the decapsulated media stream 302 to a decoder and/or more sophisticated media analysis engine 300. The decapsulated RTP media stream 302 might be fed into an RTP jitter buffer prior to being processed by decoder 300.

All of the RTP tunnel characteristics identified in the RTP tunnel headers 200 can be accounted for by the central media monitor 104 prior to feeding the decapsulated packets 302 into the decoder/analysis engine 300. For example, the central media monitor 104 can reconstruct the arrival times for the decapsulated media packets as originally seen at the trap point in the local node 125. The original trap point timing is recreated by using the RTP tunnel timestamps 202C to clock the packet delivery through the jitter buffer to decoder 300.

As mentioned above, packets lost during tunnel transmission from local node 125 to NOC 102 are identified by gaps in the RTP tunnel sequence numbers 202B. Assuming there are no packets lost in the tunnel 120 and the media stream 116 stream contains the full media payload 210, the decapsulated media stream packets 302 fed to the decoder 300 should be an identical copy of the media as received by the local node 125, along with the precise timing of when the media packets arrived at the local node trap point.

If the tunneled flow 120 does not include the media stream payload 210 and no reference stream is available, no actual decode and play-out can be performed. However, statistics such as loss/jitter alarms raised, etc. can still be computed.

The tunnel 120 can also identify and report packets which were discarded by the router, switch, receiver, etc. acting as the trap point. For example, tunnel header 202A for tunnel packet 301D indicates the associated media packet was dropped at the local node 125. This information can be fed into the analysis engine 300 to both compute more accurate media stream statistics, and for deeper quality estimation. Thus, the analysis engine 300 knows exactly what media packets were lost due to packet drops at the local node 125 and not simply that something was dropped.

If the tunneled data stream 120 has loss, simply feeding the decapsulated media stream 302 into the analysis engine 300 could produce misleading data. The central media monitor 104 can thus also distinguish loss in the native media stream loss 116 from loss in tunnel 120 by identifying any missing tunnel sequence numbers 202B. Media stream analysis is then adjusted to ignore tunnel loss, and packet statistics adjusted so as not to misinterpret the underlying stream loss and jitter in media stream 116.

To explain further, each successfully tunneled and decapsulated media packet 302A-302D is presented to the decoder 300 in the sequence and at the times T1, T2, T3, and T6, respectively, when the media packets were originally trapped by the local node 125. The sequence for the decapsulated media packets 302 are identified by the associated RTP tunnel sequence numbers 202B and the RTP tunnel timestamp values T1, T2, T3, and T6 are identified in the associated RTP tunnel timestamps 202C.

In this example, tunnel packet 301B arrived at the central media monitor 104 before tunnel packet 301C. However, the tunnel headers 200 indicate that media packet 210 encapsulated in tunnel packet 301C should be supplied to decoder 300 at time T2 before the media packet 210 encapsulated in tunnel packet 301B is supplied to decode 300 at time T3.

The tunnel headers 202A and sequence numbers 202B are also used to distinguish packets lost at local node 125 from packets lost in tunnel 120. As described above, tunnel header 202A in tunnel packet 301D indicates media packet seq=4 was dropped by the local node 125. According, the central media monitor 104 will not send any associated decapsulated media packet to the decoder 300 at time T4.

However, the fifth tunnel packet 301 between tunnel packet 301D (seq=4) and 301E (seq=6) is missing. This indicates the packet was dropped during transmission from the local node 125 to NOC 102. Accordingly, the central media monitor 10 may notify the decoder 300 that a media packet 302 was dropped in tunnel 120 and accordingly should not be considered lost by the local node 125 when performing media stream analysis.

Reference Media Stream

Referring to FIG. 9, the central media monitor 104 and the decoder and analysis engine 300 (FIG. 8) are typically installed either in head-ends where the original media streams 116 are sourced, or in Network Operation Centers (NOCs) 102 which are either co-located with the head-end, or at a minimum located in locations with plenty of bandwidth and robust connections to the head-ends. Therefore, it is quite easy for the central media monitor equipment 104 to also receive the original media stream 116 in its native encapsulation, simply by joining the media session or having the media source 108 generate a tunneled data stream to the central media monitor 104.

Such a stream is referred to as a reference stream 320 because it has very close fidelity to the original media stream 116, and is in the exact format and encapsulation of the native media stream 116 sent through the network 106 to the receivers 114. The reference media stream 320 can then be used in combination with the tunneled media stream 120 received from the local media monitor 112A. The payload from the reference stream 320 can be used when the tunneled media flow 120 does not contain media payloads 210 (FIG. 3). The insertion is relatively simple for RTP encapsulated media streams by aligning up the same media stream sequence numbers. The reference media stream 320 also allows for accurate decoding even when there packet loss in tunnel 120. Other encapsulations, like MPEG2TS in UDP, can also be lined up using data in the MPEG headers.

When data is lost upstream of the trap point in local node 110A, as opposed to discarded at the trap point, the reference stream 320 can contain the original dropped media packet. This allows the analysis engine 300 (FIG. 8) to identify exactly what was lost due to packet drop upstream of the trap point and not simply indicate generally something was dropped.

Figure 10B:
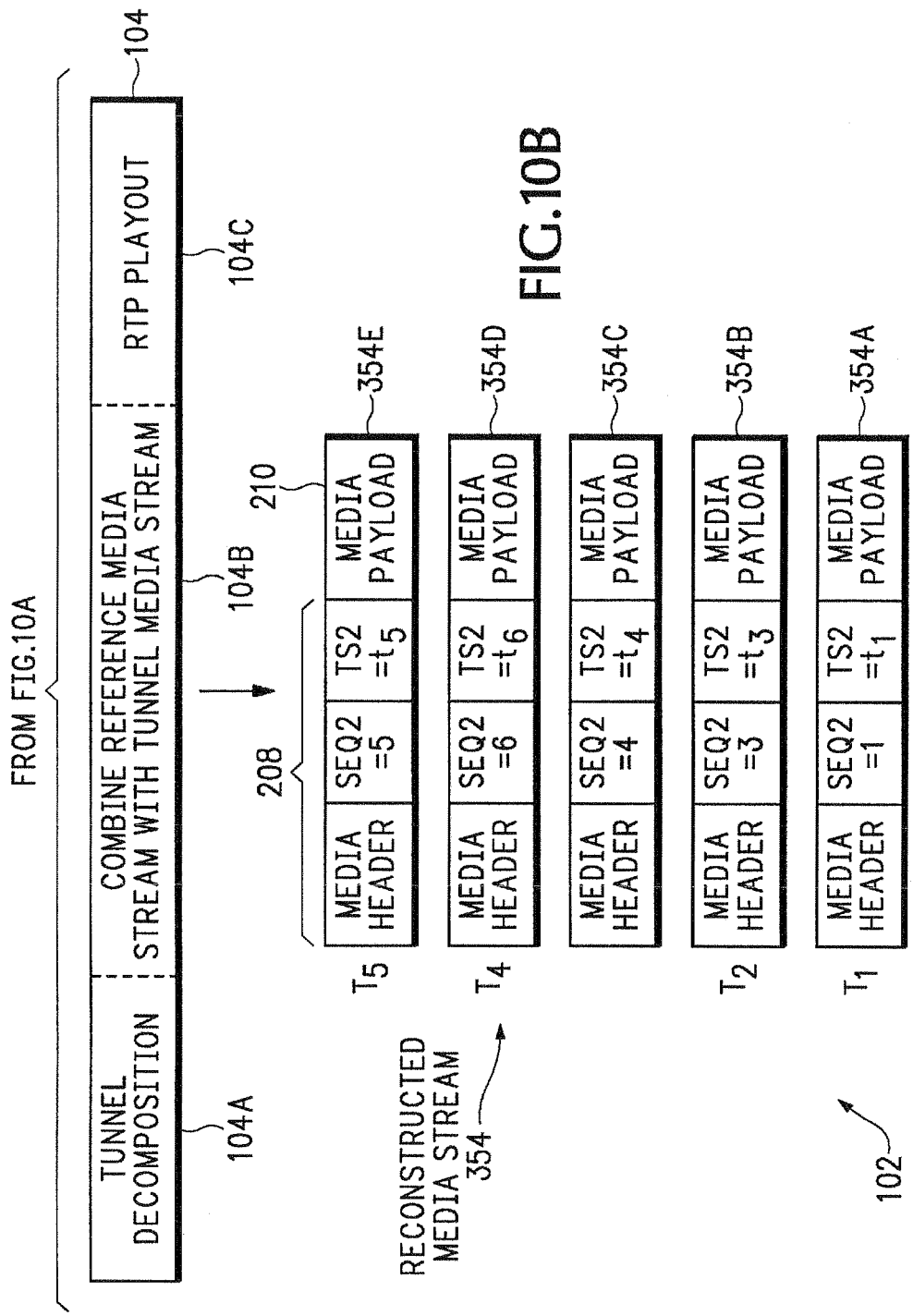

FIG. 10 shows one example of how the reference stream 320 is used by the central media monitor 104. The central media monitor 104 receives both the reference media packets from reference media stream 320 and the tunnel packets 352 from tunnel 120. As shown in FIG. 9, the reference media stream 320 is received directly from the media source 108 and the tunnel packets 352 are received from the local media monitor 112 in one of the local nodes 110 or 114.

In this example, the tunnel packets 352 do not include the media stream payload 210 that were contained in the tunnel packets 301 shown in FIG. 8. Alternatively, the tunnel packets 352 only include the tunnel header information 200 and media stream RTP header information 208. The reference media packets 350 from reference media stream 320 include the same RTP header information 208 but also include the media payloads 210.

The central media monitor 104 conducts the same tunnel decomposition 104A described above in FIG. 8 but now may also provide a reference media stream combining operation 104B prior to conducting a RTP playout operation 104C.

Figure 11:
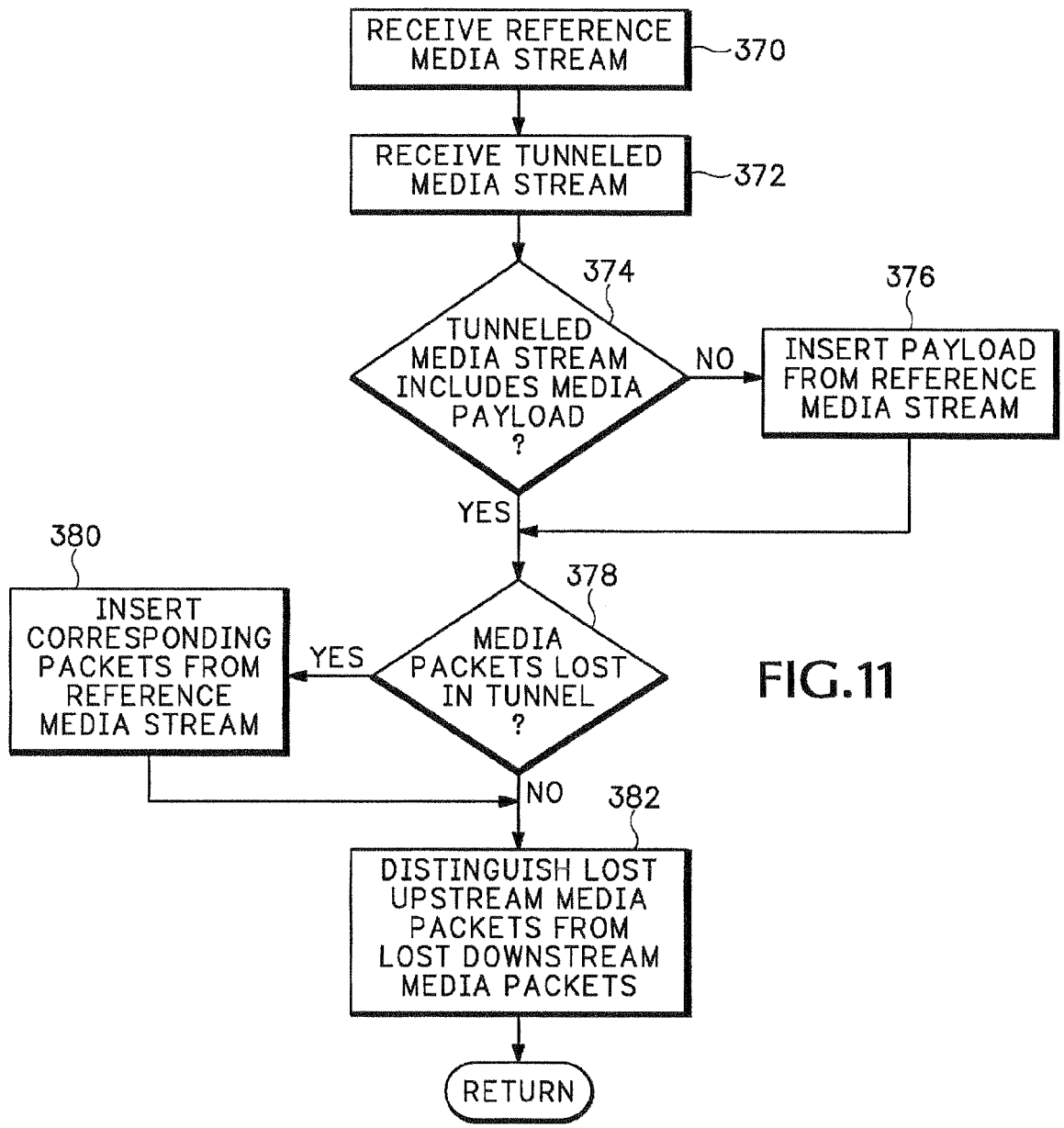
FIG. 11 is a flow diagram further describing how tunneled media packets are used in conjunction with the reference media stream.

Referring both to FIG. 10 and FIG. 11, in operation 370 the central media monitor 104 receives the reference media stream 320 and in operation 372 receives the tunneled media stream 120. If the tunneled media stream 120 does not contain the media payload 210 in operation 374, the media payload 210 from the reference media stream 320 is combined with the RTP header information 208 from tunnel 120.

If any tunnel packets 352 are dropped during transmission from the local node 125 to NOC 102 in operation 378, the corresponding packets from reference stream 320 can be inserted in operation 380. The local media monitor 104 in operation 382 may also distinguish packets lost upstream of the local media monitor 112 from other packets lost downstream of the local trap point. For example, any media packet lost in reference media stream 320 would be lost upstream and also indicated as lost by the local node 110. These upstream losses can be distinguished from downstream packets only lost by the local node.

Referring back to FIG. 10, the output of central media monitor 104 is a reconstructed media stream 354 that includes both the media packet RTP header information 208 from tunnel 120 and the corresponding media payloads 210 from the reference media stream 320.

In this example, the third tunneled packet between tunnel packet 352B and 352C was lost during tunnel transmission and not actually identified as lost by the local node 110. Accordingly, the reference packet 350C associated with the lost tunnel packet 352 is inserted as reconstructed packet 354C.

It is also determined that the media packet with seq=2 was lost upstream of the local node trap point. This is determined by recognizing that none of the reference media packets 350 have a seq=2. Accordingly, no media packet is inserted between reconstructed packets 354A and 354B in reconstructed media stream 354.

It can also be determined that the sixth media packet contained in tunnel packet 352C was received by the trap point in the local node 110 before the fifth media packet contained in tunnel packet 352D. This is determined by comparing the tunnel sequence numbers 202B and timestamp values 202C in tunnel packets 352C and 352D. Accordingly, reconstructed packet 354D with seq=6 is input to the decoder 300 (FIG. 8) at trap time T4 prior to inputting reconstructed packet 354E with seq=5 at trap time T5.

Referring again back to FIG. 9, the reference streams from any two trap points can be compared in a similar manner as comparing the monitored tunneled stream 120 with the reference stream 320. For example, two trap points 112A and 112B are located at local nodes 110A and 114B upstream and downstream, respectively, of a suspected impairment point 110C. Each of the local nodes 110A and 114B establish separate tunnels 120 and 324, respectively, with the central media monitor 104. Each local node 110A and 114B then classify, trap, clone, and tunnel back packets from media stream 116 to central media monitor 104.

For example, media packets may be indicated as lost by the downstream trap point 112B and identified as successfully received by the upstream trap point 112A. Accordingly, the lost packet may be associated to node 110C. Also, a packet lost in the tunnel 324 may be replaced by the corresponding media packet received in tunnel 120. Of course any other additional detailed forensics can be used for isolating and diagnosing faults.

Thus, a new fault isolation and diagnosis system is provided for real-time IP multimedia systems where trap, clone and tunneling is used to send data to a centralized analysis center. A novel RTP tunneling technique further improves the utility and fidelity of equipment used for analyzing faults and impairments.

The centralized media monitoring is more scalable and provides better economics than analysis equipment installed locally on the network nodes. Simple and efficient schemes are used by the nodes to implement media stream monitoring which do not require any understanding of the underlying media flows. Low bandwidth embodiments also described above can be implemented on home gateways so that impairments on access links can be analyzed in detail without perturbing the receivers.

The monitoring system can be used with any networking equipment required to have a comprehensive capability to isolate and diagnosis faults in Internet Protocol TeleVision (IPTV) or any other real-time multimedia flow.

Tunneling Media Stream Reports

Figure 12:
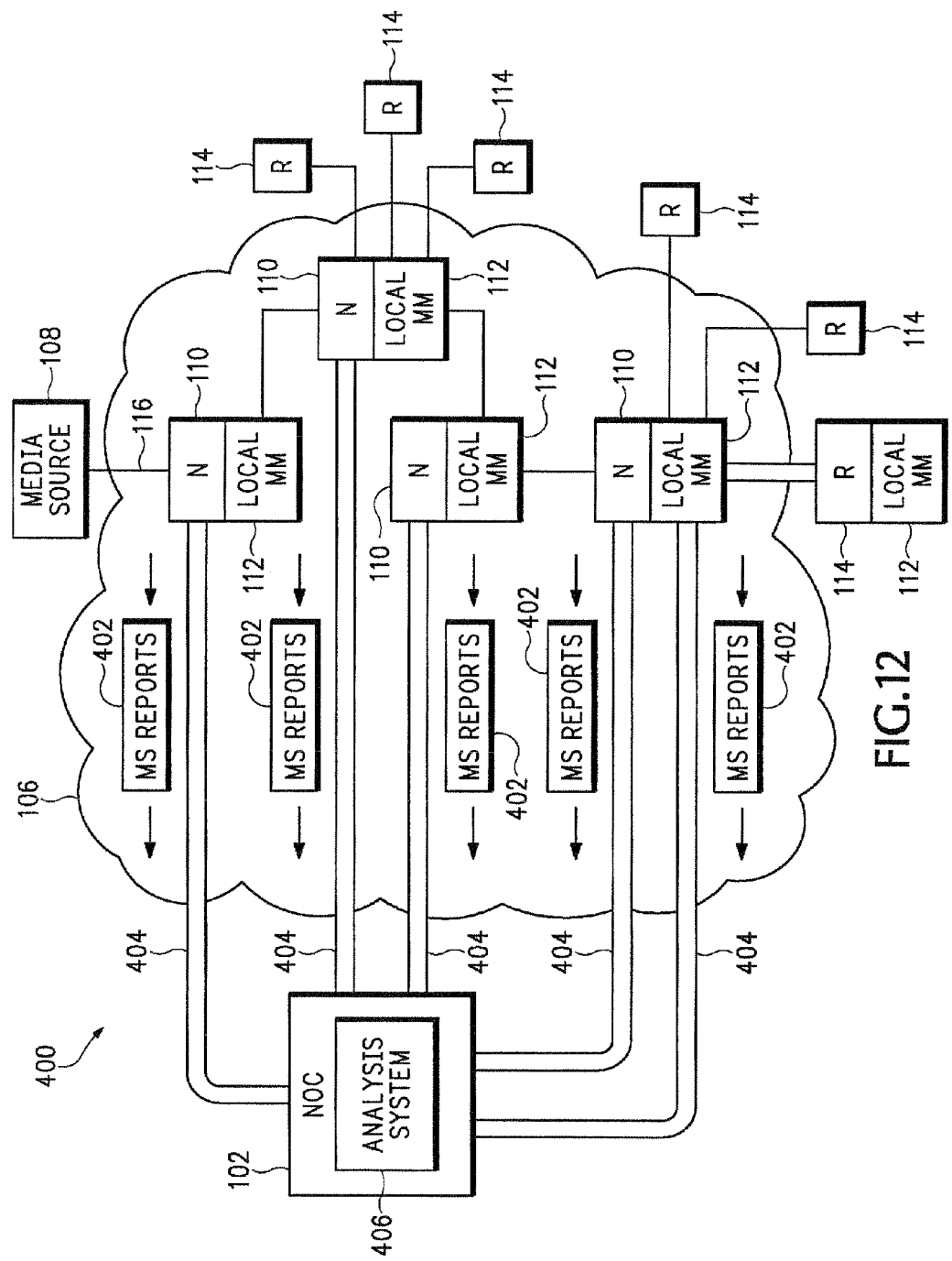
FIG. 12 is a diagram showing how a media monitoring system tunnels media stream reports back to a Network Operations Center (NOC).

FIG. 12 shows a media monitoring system 400 similar to that shown above in FIG. 1. The media source 108 sends media packets from one or more media streams 116 to any combination of receivers 114 via a packet switched network 106, alternatively referred to as the Internet. The packet switched network 106 includes multiple different intermediary nodes 110 that direct media packets from media source 108 to one or more of the different receivers 114. The nodes 110 are referred to as intermediaries because they are located in the native network path for media stream 116 in-between the media source 108 and receiver 114 endpoints.

The Network Operation Center (NOC) 102 provides a central location for monitoring different media streams 116 at different node locations in network 106. The NOC 102 can be any combination of servers and processors that analyze media stream information sent by any combination of different nodes 110 and/or 114. The NOC 102 communicates with one or more local Media Monitors (MMs) 112 that operate locally in the different nodes 110 and/or 114. In one embodiment, the local MMs 112 are implemented in software executed by a programmable processor but any combination of software and/or hardware logic can be used.

The local media monitors 112 described above in FIG. 1 trap and clone packets to produce a local copy of every media stream 116 to be monitored. The cloned packets are then sent to the NOC 102 for further analysis.

However, the local media monitors 112 for the monitoring system 400 in FIG. 12 compute preliminary packet-level statistics for the media stream 116 and then discard the trapped/cloned packets. The packet level statistics are aggregated into media stream reports 402 and sent to the NOC 102 for further analysis.

For example, the local media monitors 112 may generate media stream reports 402 that identify the number of lost packets, packet jitter, and timestamp information for media stream 116. An analysis system 406 in NOC 102 uses the packet-level statistics in reports 402 to conduct additional media stream analysis, such as long term statistical averaging and quality metric computations.

In one regard, the local media monitors 112 operate like RTP receivers that send RTCP reports back to the media source 108. However, the monitoring system 400 allows the media stream reports 402 to be generated by non-endpoint intermediary nodes 110 in the media stream network path. The media stream reports 402 can also be sent to the NOC 102 over tunnels 404. This enables the nodes 110 and/or 114 to send media stream reports 402 to a non-endpoint NOC 102 that is not located in the native path of the media stream 116.

This trap-clone scheme substitutes for a join operation in the case of a multicast session, or the insertion of an explicit RTP mixer/translator in the case of a unicast session. This keeps the local media monitors 112 transparent to the media source endpoint 108 and receiver endpoints 114 and avoids problems with perturbing media stream routing by explicit joining of a multicast stream.

In one embodiment, the local media monitors 112 produce basic Real-Time Control Protocol (RTCP) counters/statistics that are similar to those generated by media stream receivers 114 when producing conventional RTCP receiver reports. The local media monitors 112 may perform the same computations as RTCP receivers, with the exception that certain values, such as the lost packet counts, may not be synchronized with report intervals.

If sender reports for the media stream 116 are not available (either because they are not sent by the media source, or are not intercepted by the trap and clone machinery), then the total sent packet count may be unknown to the local media monitors 112. The media monitors 112 may also not have the same jitter buffer as the receivers 114. Thus, discarded packet counts for packets arriving too late for play out might not be identifiable. These differences can be taken into account by the analysis system 406.

Any type of report format and statistics can be generated by the local media monitors 112 and reported back to the NOC 102. However, RTCP type receiver reports may be convenient for incorporating into the local media monitors 112 since RTCP reporting is well established and by using RTCP the metrics reported for the monitored stream may be directly compared with those generated by the normal stream receivers.

Rather than accumulating media stream statistics over long intervals and implementing thresholding and alarming, the local media monitors 112 can use tunneling scheme similar to that described above in FIGS. 1-11 to periodically send the media stream reports 402 to NOC 102. This prevents the network devices 110 and/or 114 from having to maintain and process large amounts of state information for media stream 116.

Figure 13:
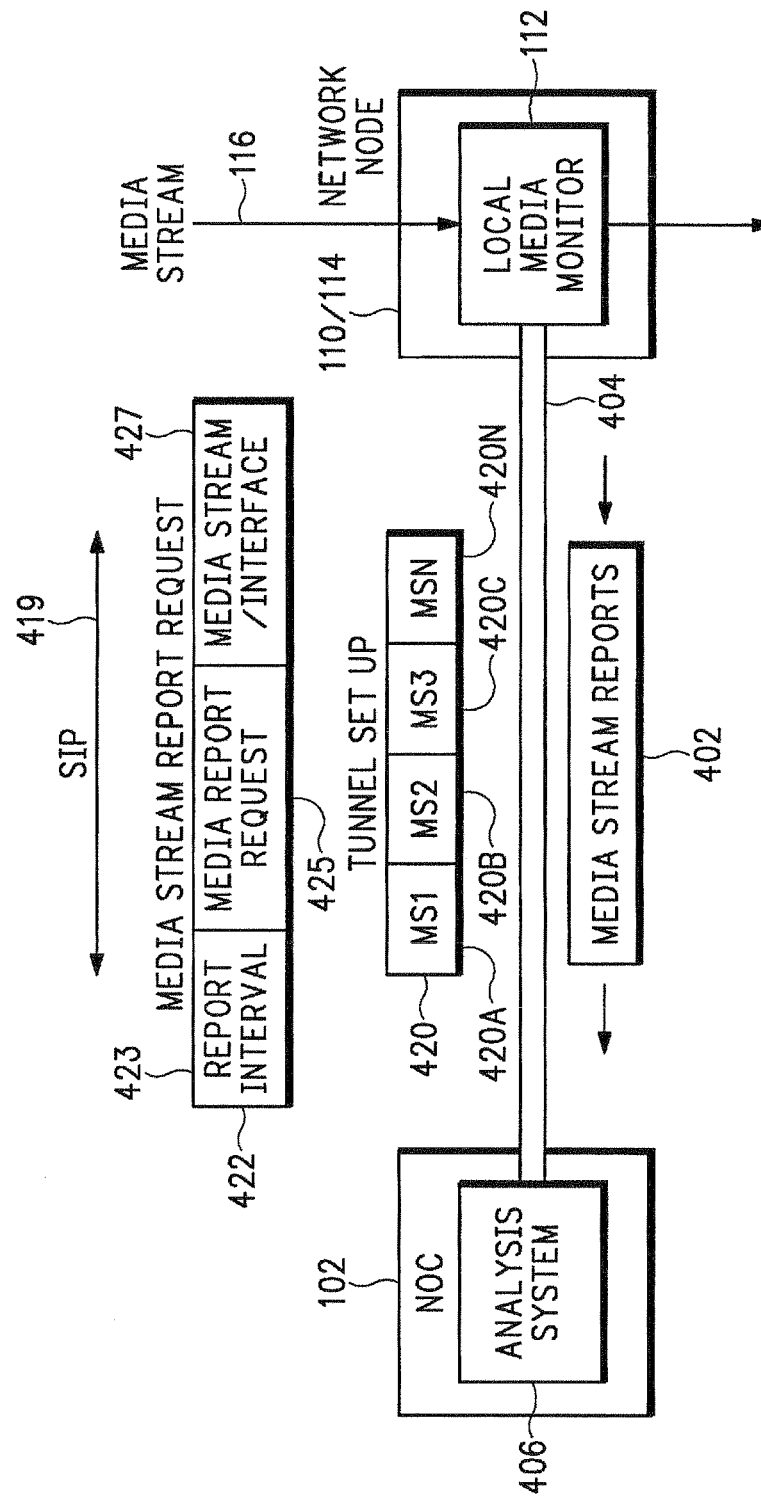
FIG. 13 is a block diagram showing how tunneled media stream reporting is initiated.

FIG. 13 explains how media stream reporting is initiated and how the tunnels 404 are set-up. For example, a SIP protocol 419 may be used between the NOC 102 and the local media monitors 112 to initiate media stream reporting. A SDP tunnel setup message 420 is sent from the NOC 102 to network nodes 110 and/or 114 that contain information for setting up tunnels 404. An SDP media stream report request 422 is also sent from the NOC 102, to the network nodes that contains information 427 identifying the interfaces 144 and 148 (FIG. 2) and media streams for monitoring.

The tunnel set up and monitoring protocol is similar to that described above in FIGS. 1-11, however, there are some possible differences and/or enhancements. A reporting interval 423 may be communicated in message 422, rather than using the RFC3550 RTCP timer rules used by conventional RTP receivers 114. Rather than indicating which headers to include and whether to include a packet payload, the SDP message 422 may include a media stream report request 425 that indicates no packets of the media stream 116 should be tunneled.

Tunnel setup message 420 can use the same SIP with three MIME bodies as described above. However, one enhancement increases scaling by allowing a single tunnel to carry the RTCP reports for a large number of monitored media streams. One technique uses SIP-based tunnel setup to carry multiple SDP messages 420A-420N each identifying one of the media streams to trap. One additional SDP message 420 then identifies the tunnel for carrying the reports and the interface(s) for installing monitoring traps.

A second tunnel setup scheme carries all the media stream flows in a single SDP as separate m=lines. The advantage of the first scheme is that the integrity and general information is maintained for each media session to be monitored. The second scheme provides more efficient encoding for tunnel setup.

It should be understood that the report monitoring scheme described in FIG. 13 can also be combined with the monitoring scheme described above that sends the entire media stream to the NOC 102. The NOC 102 may originally request only report monitoring as described in FIG. 13. However, when the media stream reports 402 indicate a possible media stream problem, the NOC 102 can then initiate complete or partial media stream trap, clone, and tunneling as described in FIG. 6 for any identified media stream at any identified network node.

Media Stream Reports

Figure 14:
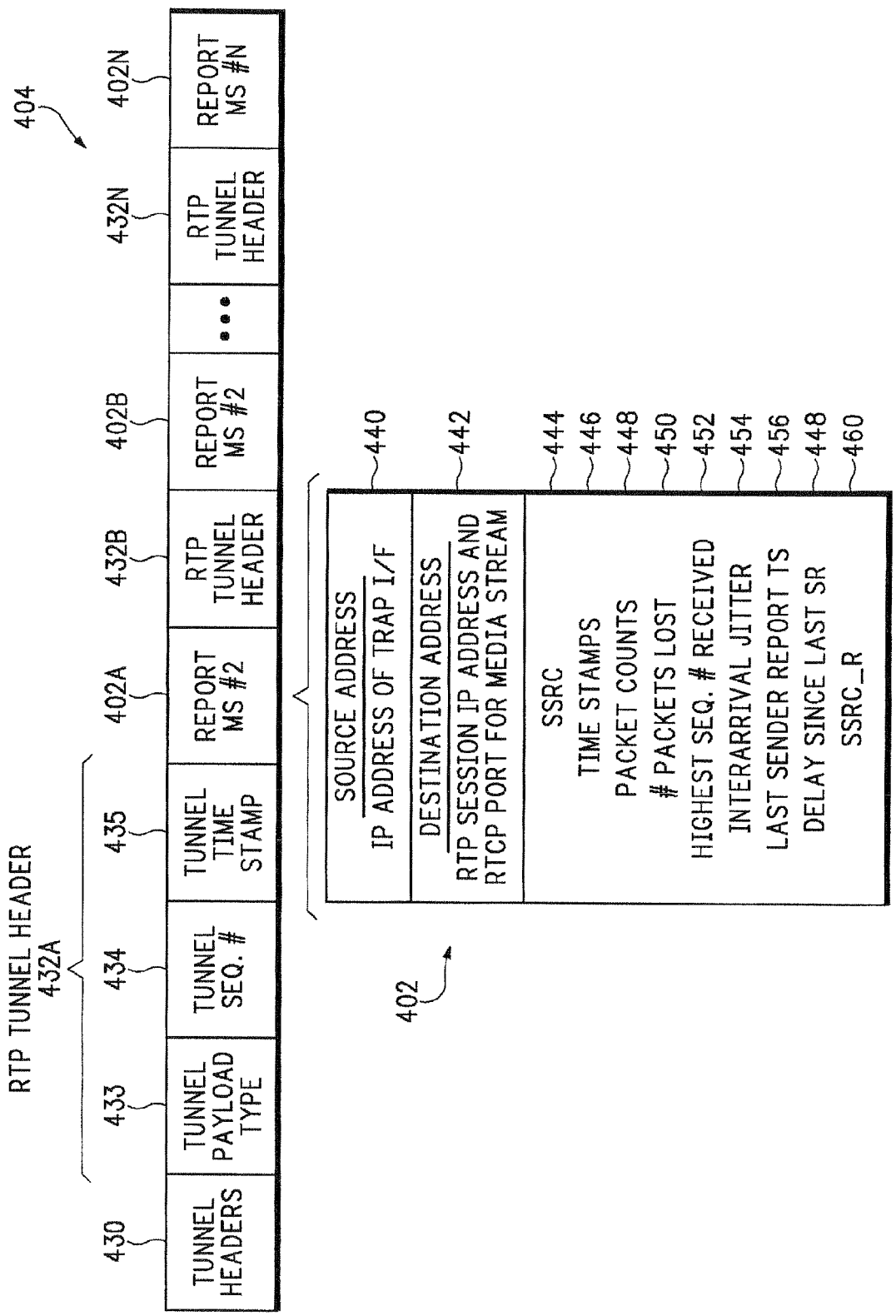
FIG. 14 is a diagram of the tunnel that carries media stream reports.

FIG. 14 shows some of the information that may be sent over the tunnels 404 from the nodes 110 and/or 114 to the NOC 102 pursuant to the report and tunnel set-up messages in FIG. 13. The media stream reports 402 can be sent using any sort of tunneling protocol. In one embodiment, the monitoring system uses an extension of the tunneling scheme described above in FIGS. 1-11. For example, the tunnel 404 includes a tunnel header 430 and RTP tunnel headers 432 that include a tunnel payload type 433, sequence number 434, and time stamp 435 similar to those previously shown in FIG. 4.

The tunnel 404 also includes one or more media stream reports 402A-402N that can each be associated with the same or different media streams. Each media stream report 402 may contain any statistics or analytic information derived by the network node 110 and/or 114 for the monitored media stream. However, in one example, the reports 402 contain some of the same statistics contained in conventional RTCP reports. The generation and type of information contained in RTCP reports is described in Request For Comment (RFC) 3550 which is herein incorporated by reference.

Each media stream report 402 can be accompanied with an associated RTP tunnel header 432. This allows the NOC 102 to identify any media stream reports 402 that may have been lost during tunnel transmission. As described above in FIG. 13, the number of media stream reports 402 to include in the same tunnel 404 can be specified in SDP message 420.

Figure 15:
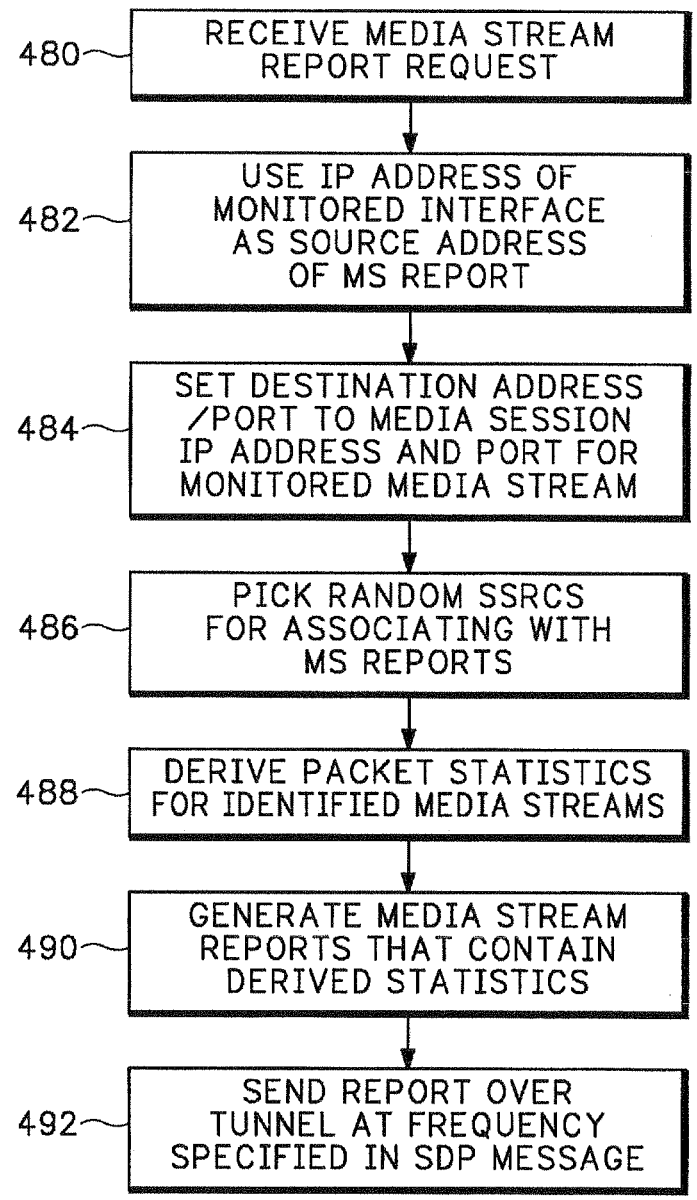
FIG. 15 is a flow diagram explaining how a network node initiates and generates media stream reports.

FIG. 15 describes in more detail the operations performed by the local media monitor 112 in one of the nodes 110 and/or 114. Referring to FIGS. 14 and 15, the local media monitor 112 receives a media stream report request in operation 480. The local media monitors 112 in operation 482 use the IP address of the identified interface 144 or 148 (FIG. 2) where the trap install is requested as the source address 440 of the media stream report 402. In operation 484, the destination address/port 442 is set to the RTP session IP address and RTCP port for the identified media stream. This is obtained from the messages 420 and 422 sent during tunnel setup in FIG. 13.

The IP address 440 of the interface being monitored is used as the source of the reports 402. The RTCP reports when coming from endpoint receivers can be trivially associated with the RTP session received by that receiver. However, the reports 402 may not come from receivers. Reports 402 explicitly identify the associated RTP session by including the destination IP address and port of the RTP stream in field 442.

In operation 486, the local media monitor 112 randomly picks an SSRC 444 similarly as defined in RFC3550. The SSRC 444 will not be subject to the SSRC collision detection scheme in RFC3550. Collision detection is not needed because the NOC 102 can distinguish the media stream reports 402 encapsulated in tunnel 404 from conventional non-tunneled RTCP receiver reports.

The frequency that the local media monitors 112 generate media stream reports 402 can be obtained from a b=RR: specifier 423 in the SDP message 422 provided during tunnel setup. Note that the report intervals 423 could be different from conventional RTCP reports generated by native receiver endpoints for the media stream. The NOC 102 may want more frequent or less frequent media stream reports 402 depending on monitoring needs.

The local media stream monitor 112 derives packet statistics for the identified media streams in operation 488. This could include any of the statistics normally generated in a RTCP report by a media stream receiver. For example, the media stream reports 402 in FIG. 14 could include different media report timestamps 446, packet counts 448, number of lost packets 450, highest sequence number 452 for any received RTP packet, inter-arrival jitter values 454, last sender report timestamp 456, amount of delay 458 since a last sender report, and a receiver SSRC value 460.

Again, these are just examples of the packet level statistics that may be generated by the local media monitors 112 and tunneled to the NOC 102. Other information that may be contained in the media stream reports 402 is listed in RFC 3550, which has been incorporated by reference. As also described above, some of these packet level statistics might not be available if certain media sender reports cannot be received by the local media monitor 112. Other statistics not listed in RFC 3550 could also be derived.

Referring back to FIG. 15, the local media monitor in operation 490 aggregates the derived statistics into media stream reports 402. The reports are then encapsulated in tunnel headers 430 and 432 as shown in FIG. 14 and sent to NOC 102.

Figure 16:
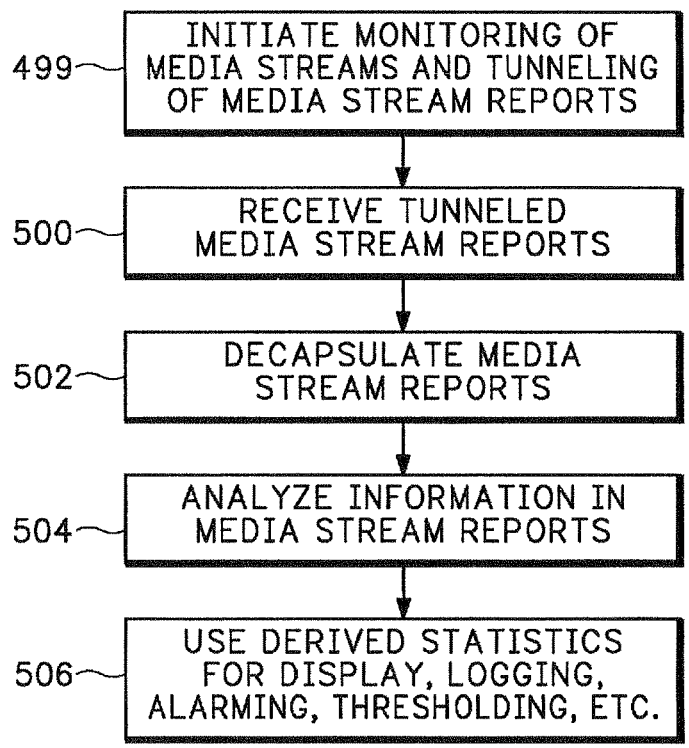
FIG. 16 is a flow diagram explaining how the NOC initiates and processes media stream reporting.

FIG. 16 shows the operations of the NOC 102 in more detail. These are an extension of the NOC operations described above in FIGS. 1-11. The NOC initiates the monitoring of the media streams and tunneling in operation 499. In operation 500, the NOC 102 subsequently receives the tunneled media stream reports 402.

The media stream reports 402 are de-capsulated from the other tunneling information in operation 502 and the statistical information contained in the media stream reports is further analyzed in operation 504. For example, the analysis system 406 in FIG. 13 may compute more aggregated metrics, such as MDI, R-factor, etc. MDI is the Media Delivery Index as defined in RFC 4445. R-factor is defined in ITU P.563. R-factor is an objective metric calculated from loss, jitter, delay, at the audio/video frame level which is claimed to correlate well with MOS (Mean Opinion Score).

The analysis system 406 in operation 506 uses the statistical information for display, logging, alarming, thresholding, or any other number of operations. For example, whenever a threshold number of packets from a media stream are identified as lost by one or more media stream reports 402, the NOC 102 may send a notification to a network administrator.

The NOC 102 either automatically, or pursuant to initiation by the network administrator, may initiate full media stream packet monitoring as described above in FIGS. 1-11. For example, the NOC 102 could direct one or more of nodes 110 and/or 114 to trap, clone, and tunnel all of the packets from the suspect media stream back to NOC 102. The trapped and cloned media stream packets are tunneled back to the NOC 102 provide more in-depth media stream analysis.

Thus, the report monitoring scheme allows the NOC 102 to evaluate the overall network based on periodically received media stream reports 402. Any potential problems in the network can be flagged by the NOC 102 and further more detailed analysis initiated. This eliminates each individual node 110 or 114 from having to provide the alarms, thresholding, etc. normally required for notifying a network administrator or NOC 102 of a media stream problem.

As with the full packet tunneling scheme in FIGS. 1-11, the reporting scheme allows same media streams to be monitored at multiple points. This enables more useful analysis and visualization, such as showing how media streams are degrading as they progress through the network 106 in FIG. 12. However, multi-node monitoring is easier to perform with the report generation and tunnel approach since the NOC 102 no longer has to poll routers/switches for state information while still retaining final thresholding and discrimination functions.

Only moderate bandwidth is required on a per stream basis from each of the intermediate nodes providing media stream reporting. For example, the bandwidth usage required by the nodes 110 and/or 114 may only be around 0.25 Packets Per Second (PPS) per media stream. Thus, hundreds of monitoring points can be established that monitor many media streams 116 at the same time. The data load on the NOC 102 is similarly tractable.

Thus it has been shown that the trap-clone-tunnel scheme can also be used to send packet level statistic reports 402 to a centralized NOC 102. Accordingly, better scalability is provided than computing the complex statistics in the intermediate routers/switches 110 or receivers 114.

Several preferred examples have been described above with reference to the accompanying drawings. Various other examples of the invention are also possible and practical. The system may be exemplified in many different forms and should not be construed as being limited to the examples set forth above.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown are conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I/We claim all modifications and variation coming within the spirit and scope of the following claims.

The invention claimed is:
1. A non-transitory computer readable storage media encoded with software comprising computer executable instructions and when the software is executed operable to:
  receive, at an intermediate device, a first request for a media stream report at a predetermined time interval, the request identifying at least one media stream and a periodicity for the media stream report;
  monitor, in response to the first request, the at least one media stream established between media stream endpoints;
  generate the media stream report for the at least one media stream at the predetermined interval, wherein the media stream report includes real-time packet transportation statistics for the at least one media stream;
  set-up a tunnel to a central media monitor;
  send the media stream report over the tunnel to the central media monitor for further media stream analysis;
  receive, from the central media monitor, a second request for initiation of a media stream packet monitoring, wherein receiving the second request comprises receiving the second request in response to the central media monitor determining a potential problem in a network connecting the at least one media stream based on the media stream report; and send, in response to the second request, packets from a suspect media stream by the intermediary device, wherein sending the packets by the intermediary device comprises:

trapping the packets from the suspect media stream, wherein trapping comprises assigning and binding a time stamp with each of the trapped packets, wherein the time stamp is provided by a local clock associated with the intermediate device at an instance when each of the packets are trapped, cloning the trapped packets, and encapsulating the cloned packets into the tunnel to the central location for in-depth analysis of the suspect media stream.

2. The non-transitory computer readable storage media of claim 1 wherein the media stream report identifies at least one of the following: a number of lost packets, packet jitter, or timestamp information for the media stream.

3. The non-transitory computer readable storage media of claim 1 wherein the central media monitor is out of a network path between the media stream endpoints.

4. The non-transitory computer readable storage media of claim 1 wherein trapping and cloning the trapped packets during a multicast session is a substitute join operation.

5. The non-transitory computer readable storage media of claim 1 encoded with software comprising computer executable instructions, the software when executed is further operable to receive an Session Description Protocol (SDP) media stream report request from the central media monitor that initiates monitoring the media stream.

6. The method of claim 1, wherein encapsulating the cloned packets into the tunnel to the central location comprises encapsulating the cloned packets using a real-time protocol (RTP) session to instantiate the tunnel.

7. The method of claim 1, wherein encapsulating the cloned packets into the tunnel to the central location comprises removing payload from the cloned packets and attaching a tunnel header to the remaining portion of each of the packets.

8. The method of claim 6, encapsulating the cloned packets into the tunnel to the central location further comprises converting the time stamp into an RTP tunnel time stamp.

9. An apparatus, comprising:
a processor; and
a memory coupled to the processor comprising instructions executable by the processor, the processor operable when executing the instructions to:
initiate monitoring of at least one media stream, wherein initiating the monitoring comprises sending, to an intermediate device, a first request for a media stream report at a predetermined time interval, the request identifying the at least one media stream and a periodicity for the media stream report;
receive the media stream reports corresponding to the at least one media stream, wherein the media stream reports comprise a packet level analysis generated by the intermediary device,
analyze the received reports to determine at least one of: media delivery index, and objective metric,
determine, based on the analysis, a potential problem in a network connecting the at least one media stream, and
send a second request to the intermediary device for all of the packets from a suspect media stream for in-depth analysis of the suspect media stream, wherein the intermediary device, in response to the second request, is configured to:
trap the packets from the suspect media stream, wherein trapping comprises assigning and binding a time stamp with each of the trapped packets, wherein the time stamp is provided by a local clock associated with the intermediate device at an instance when each of the packets are trapped,
clone the trapped packets, and
encapsulate the cloned packets into a tunnel to the apparatus for in-depth analysis of the suspect media stream.

10. The apparatus according to claim 9 wherein the processor resides in a Network Operation Center (NOC) that is located outside of a native network path for the at least one media stream.

11. The apparatus according to claim 9 wherein the processor determines when the reports were generated and in what sequence the reports were encapsulated and sent over one or more tunnels based on tunnel headers encapsulating the reports.

12. The apparatus according to claim 9 wherein the processor receive the reports via one or more tunnels.

13. The apparatus according to claim 9 wherein the processor use the packet-level statistics received in the reports to conduct additional media stream analysis including at least one of long term statistical averaging or quality metric computations.

14. The apparatus according to claim 9 wherein the processor receives the reports generated for multiple different media streams via a same tunnel.

15. The apparatus according to claim 9 wherein the reports are Real-Time Control Protocol (RTCP) reports.

16. The apparatus according to claim 9 wherein the intermediary device is local.

17. The apparatus according to claim 9 wherein the intermediary device is remote.

18. The apparatus according to claim 9 wherein the processor sends a Session Description Protocol (SDP) media stream report request for initiating monitoring the media stream by the intermediary device.

19. A method comprising:
initiating monitoring of at least one media stream and tunneling, wherein initiating the monitoring comprises sending, to an intermediate device, a first request for a media stream reports at a predetermined time interval, the request identifying the at least one media stream and a periodicity for the media stream report;
receiving the tunneled media stream reports from the intermediary device;
de-capsulating the media stream reports from other tunneling information;
analyzing statistical information contained in the media stream reports to determine at least one of: a media delivery index, and objective metric;
using the statistical information for display, logging, alarming, or thresholding, or combinations thereof;
determining, based on the analysis, a potential problem in a network connecting the at least one media stream; and
sending a second request to the intermediary device to trap, clone, and tunnel all of the packets from a suspect media stream for in-depth analysis of the suspect media stream, wherein the intermediary device, in response to receiving the second request, is configured to:
trap the packets from the suspect media stream, wherein trapping comprises assigning and binding a time stamp with each of the trapped packets, wherein the time stamp is provided by a local clock associated with the intermediate device at an instance when each of the packets are trapped, clone the trapped packets, and encapsulate the cloned packets into the tunnel to a central location for in-depth analysis of the suspect media stream.

20. The method according to claim 19, further comprising computing the Media Delivery Index based on the statistical information.

\* \* \* \* \*